(12) United States Patent
Sun et al.

(10) Patent No.: US 12,701,612 B2
(45) Date of Patent: *Aug. 4, 2026

(54) CATEGORY-2 LISTEN-BEFORE-TALK (LBT) OPTIONS FOR NEW RADIO-UNLICENSED (NR-U)

(71) Applicant: QUALCOMM Incorporated, San Diego, CA (US)

(72) Inventors: Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 607 days.

This patent is subject to a terminal disclaimer.

(21) Appl. No.: 18/325,314

(22) Filed: May 30, 2023

(65) Prior Publication Data

US 2023/0389070 A1      Nov. 30, 2023

Related U.S. Application Data

(63) Continuation of application No. 16/717,254, filed on Dec. 17, 2019, now Pat. No. 11,706,800.

(30) Foreign Application Priority Data

Dec. 21, 2018    (IN) ............................. 201841048655
Mar. 16, 2019    (IN) ............................. 201941010290

(51) Int. Cl.
*H04W 74/0808* (2024.01)
*H04W 16/14* (2009.01)
(52) U.S. Cl.
CPC ....... *H04W 74/0808* (2013.01); *H04W 16/14* (2013.01)

(58) Field of Classification Search
CPC .......................... H04W 74/0808; H04W 16/14
See application file for complete search history.

(56) References Cited

U.S. PATENT DOCUMENTS

| | | |
|---|---|---|
| 11,706,800 B2 | 7/2023 | Sun et al. |
| 2017/0331670 A1 | 11/2017 | Parkvall et al. |

(Continued)

FOREIGN PATENT DOCUMENTS

| | | |
|---|---|---|
| EP | 3145264 A1 | 3/2017 |

OTHER PUBLICATIONS

Intel Corporation: "UL LBT for Self-Carrier Scheduling," 3GPP Draft, R1-155312, 3GPP TSG RAN WG1 Meeting #82bis, 3rd Generation Partnership Project (3GPP), Mobile Competence Centre, 650, Route Des Lucioles, F-06921, Sophia-Antipolis Cedex, France, vol. RAN WG1, No. Malmo, Oct. 5, 2015-Oct. 9, 2015, Oct. 4, 2015 (Oct. 4, 2015), XP051039626, 5 pages, sections 2, 3.1 and 3.2, pp. 1-3.

(Continued)

*Primary Examiner* — Siren Wei
(74) *Attorney, Agent, or Firm* — Harrity & Harrity, LLP \ Qualcomm

(57) ABSTRACT

Wireless communications systems and methods related to performing listen-before-talk (LBT) before a transmission after a link switch in a frequency spectrum shared by multiple network operating entities are provided. A first wireless communication device receives, from a second wireless communication device, a first communication signal. The first wireless communication device determines a first measurement period in a first portion of a gap duration between the first communication signal and a second communication signal, the first portion being adjacent to a start time of the second communication signal. The first wireless communication device performs an LBT based at least in (Continued)

part on a first channel measurement in the first measurement period. The first wireless communication device transmits, to the second wireless communication device, the second communication signal based on the LBT.

20 Claims, 14 Drawing Sheets

(56)                    References Cited

U.S. PATENT DOCUMENTS

| 2018/0192442 A1 |     | 7/2018  | Li et al.      |             |
|-----------------|-----|---------|----------------|-------------|
| 2018/0249339 A1 | *   | 8/2018  | Noh ...................... | H04L 27/261 |
| 2018/0270860 A1 |     | 9/2018  | Bhorkar et al. |             |
| 2018/0352573 A1 | *   | 12/2018 | Yang ..................... | H04W 16/14  |
| 2019/0014596 A1 |     | 1/2019  | Yang et al.    |             |
| 2019/0150170 A1 |     | 5/2019  | Park et al.    |             |
| 2019/0200379 A1 |     | 6/2019  | Wang et al.    |             |
| 2020/0037359 A1 | *   | 1/2020  | Wang ................... | H04W 72/23  |

OTHER PUBLICATIONS

International Search Report and Written Opinion—PCT/US2019/ 067141—ISA/EPO—Mar. 17, 2020.

\* cited by examiner

2400

Receive first communication signal ~2410

Determine measurement period based on first gap duration between first communication signal and second communication signal ~2420

Perform LBT based on channel measurement in measurement period ~2430

Transmit second communication signal based on LBT ~2440

CATEGORY-2 LISTEN-BEFORE-TALK (LBT) OPTIONS FOR NEW RADIO-UNLICENSED (NR-U)

CROSS REFERENCE TO RELATED APPLICATIONS

The present application is a continuation application which claims priority to and the benefit of U.S. patent application Ser. No. 16/717,254, filed Dec. 17, 2019, which claims priority to and the benefit of Indian Provisional Patent Application No. 201841048655, filed Dec. 21, 2018 and Indian Provisional Patent Application No. 201941010290, filed Mar. 16, 2019, each of which is hereby incorporated by reference in its entirety as if fully set forth below and for all applicable purposes.

TECHNICAL FIELD

This application relates to wireless communication systems, and more particularly to communications before a link switch and/or after a link switch in a frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a wireless node (e.g., a BS or a UE) may perform a category 1 (CAT1) LBT (e.g., no LBT measurement), a category 2 (CAT2) LBT, or a category 4 (CAT4) LBT prior to transmitting in a shared channel. In some examples, a wireless node may determine which type or category of LBT to perform before a transmission after a link switch (e.g., from uplink (UL) to downlink (DL) or from downlink (DL) to uplink (UL)) based on the duration of the link switch. In some examples, a network such as a long term evolution-license assisted access (LTE-LAA) network or a long term evolution-enhanced license assisted access (LTE-eLAA) network may have defined certain fixed measurement windows within a link switch duration for LBT measurements. However, link switch durations may vary in a network, for example, due to propagation delays, processing delays at transmitters and/or receivers, switching delays at transmitters and/or receivers, and thus may not necessarily accommodate the fixed measurement windows. In particular, the link switch duration in NR-U may be shorter than the link switch duration in LTE-eLAA, for example, due to the improved overall system efficiency and the faster processing timelines in NR compared to LTE.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communication device from a second wireless communication device, a first communication signal; determining, by the first wireless communication device, a first measurement period in a first portion of a gap duration between the first communication signal and a second communication signal, the first portion being adjacent to a start time of the second communication signal; performing, by the first wireless communication device, a listen-before-talk (LBT) based at least in part on a first channel measurement in the first measurement period; and transmitting, by the first wireless communication device to the second wireless communication device, the second communication signal based on the LBT.

In an additional aspect of the disclosure, an apparatus includes a transceiver configured to receive, from a second wireless communication device, a first communication signal; and a processor configured to determine a first measurement period in a first portion of a gap duration between the first communication signal and a second communication signal, the first portion being adjacent to a start time of the second communication signal; and perform a listen-before-talk (LBT) based at least in part on a first channel measurement in the first measurement period, where the transceiver is further configured to transmit, to the second wireless communication device, the second communication signal based on the LBT.

In an additional aspect of the disclosure, a non-transitory computer-readable medium having program code recorded thereon, the program code including code for causing a first wireless communication device to receive, from a second wireless communication device, a first communication signal; code for causing the first wireless communication device to determine a first measurement period in a first portion of a gap duration between the first communication signal and a second communication signal, the first portion being adjacent to a start time of the second communication signal; code for causing the first wireless communication device to perform a listen-before-talk (LBT) based at least in part on a first channel measurement in the first measurement period; and code for causing the first wireless communication device to transmit, to the second wireless communication device, the second communication signal based on the LBT.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
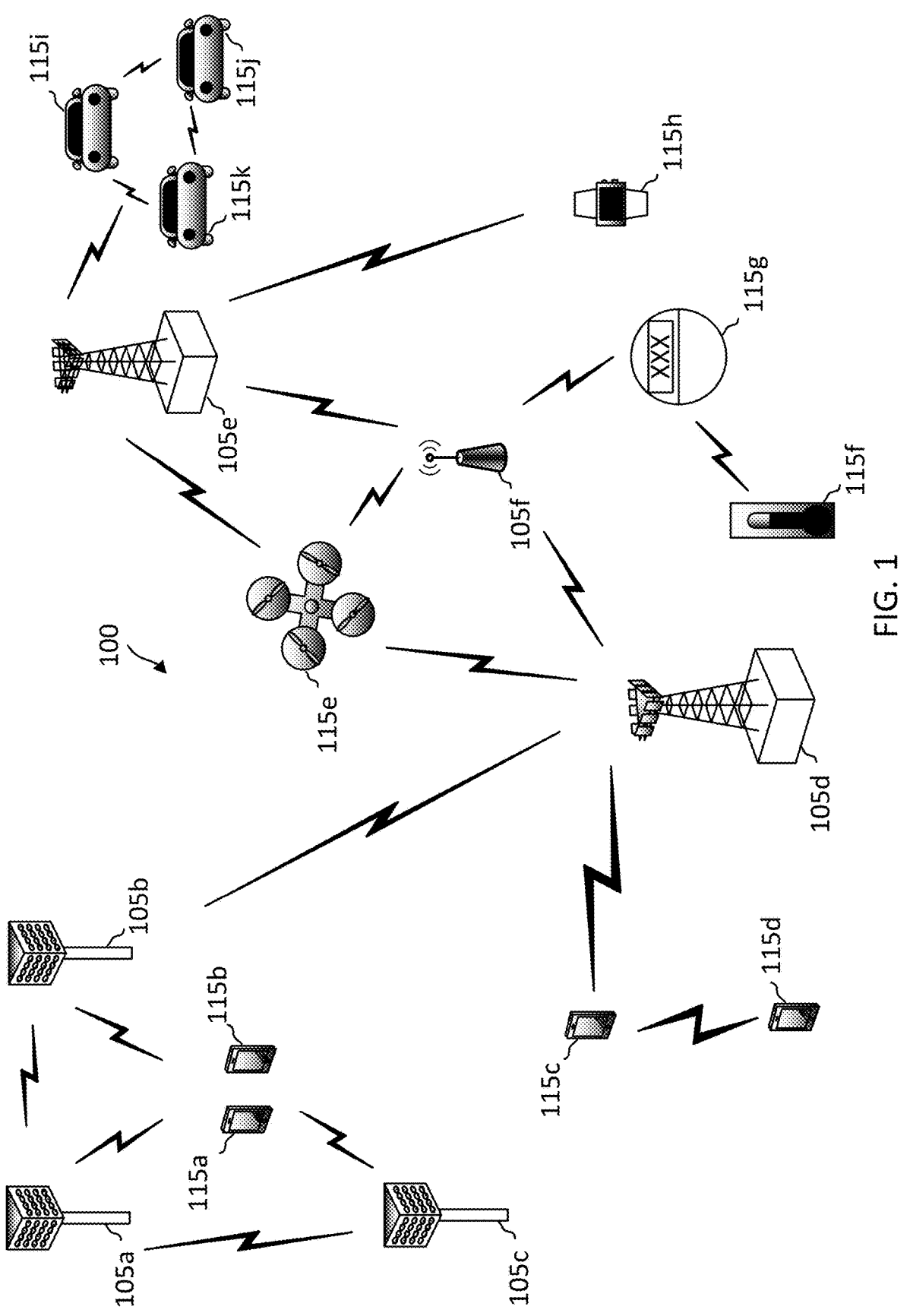
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 404.11, IEEE 404.16, IEEE 404.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for communications before a link switch and/or after a link switch in a frequency spectrum (e.g., an unlicensed spectrum or a shared spectrum) shared by multiple network operating entities. For example, a first wireless communication device receives a first communication signal in a first link direction from a second wireless communication device and then transmits a second communication signal to the second wireless communication device in a second link direction different from the first link direction. The first wireless communication device may determine whether to perform an LBT and/or which type of LBT (e.g., no LBT, a CAT2 LBT of different durations, and or a CAT4 LBT) to perform prior to transmitting the second communication signal. This determination may be in part based on the duration of the link switch. The first wireless communication device may determine one or more measurement windows within the link switch duration for LBT measurement or energy detection. In an example, the first wireless communication device may be a BS and the second wireless communication device may be a UE, and thus the first link direction is UL and the second link direction is DL. In another example, the first wireless communication device may be a UE and the second wireless communication device may be a BS, and thus the first link direction is DL and the second link direction is UL.

In an embodiment, the BS or the UE may determine the link switch duration based on a timeline of the BS. In an embodiment, the BS or the UE may determine the link switch duration based on a timeline of the UE. In an embodiment, the BS or the UE may determine a link switch duration based on an absolute transmission end time of the first communication signal and/or an absolute transmission start time of the second communication signal. In an embodiment, the BS or the UE may consider channel delay spread parameters, multi-path channel parameters, and/or timing advance parameters associated with a communication between the BS and the UE when determining a link switch gap duration. In an embodiment, the BS and the UE may apply different configurations for determining a link switch gap duration. For example, the BS may determine a link switch gap duration based on a timeline maintained by the BS for a CAT2 LBT and the UE may determine a link switch gap duration based on an absolute time for a CAT2 LBT.

In an embodiment, the BS or the UE may time-partition a link switch gap duration into about three slots. The BS or the UE may perform energy detection in a measurement period within a beginning portion of the link switch gap duration and in a measurement period within an end portion of the link switch gap duration. The BS or the UE may refrain from performing channel energy measurements in a middle portion of the link switch gap duration between the beginning portion and the end portion. When the link switch gap duration is short (e.g., less than about 25 μs), the BS or the UE may use a predetermined duration for one or more of the portions and allow one or more other portions of the link switch gap duration to vary according to the link switch gap duration. Alternatively, the BS or the UE may exclude any one of the portions to fit the measurement periods into the available link switch gap duration.

In embodiment, the BS may configure the UE with a particular link switch gap configuration (e.g., referencing timing to the BS's timeline, the UE's timeline, or absolute time) and the UE may determine an LBT type based on the configuration. In an embodiment, the BS may configure the UE with an LBT type. In this case, the BS may determine the LBT type for the UE based at least in part on the gap configuration/duration. The BS may signal the link switch gap configuration and/or the LBT configuration via an RRC message, a media access control (MAC) control element (CE) message, and/or a PDCCH downlink control information (DCI) message (e.g., a scheduling grant).

In an embodiment, the BS may apply a cyclic postfix to a DL transmission prior to a DL-to-UL switch to provide a desired or required duration for the DL-to-UL switch. Alternatively, the BS may configure the UE to apply an extended cyclic prefix (ECP) to a UL transmission after DL-to-UL switch. In an embodiment, the BS may apply an ECP to a DL transmission after a UL-to-DL switch to provide a desired or required duration for the UL-to-DL switch. Alternatively, the BS may configure the UE to apply a cyclic postfix to a UL transmission before the UL-to-DL switch. The length of a cyclic extension (e.g., ECP or cyclic postfix) can be determined based on a number of symbols between an UL schedule and a DL schedule, the desired link switch gap duration, a timing advance parameter associated with the BS and the UE, a propagation delay parameter associated with the BS and the UE, and/or a channel delay spread parameter associated with the BS and the UE. The cyclic extension with the ECP may also be referred to as a CP extension (CPE). As discussed, the CPE is used to provide the desired link switch gap duration. Accordingly, the CPE is an extension beyond the cyclic prefix of a normal duration or an extended duration that the BS and UE may use for transmissions (e.g., for symbols other than first symbol in an UL/DL transmission burst) to mitigate inter-symbol interference (ISI). The BS may signal a cyclic extension configuration via an RRC message, and/or a DCI message (e.g., UE-specific DCI message, a group common DCI message for multiple UEs). While the disclosed embodiments are described in the context of NR-U, the disclosed embodiments are suitable for use in any wireless network and/or with any wireless communication protocols.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 1050 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform back-haul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical com-munications with ultra-reliable and redundant links for mis-sion critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by commu-nicating with another user device which relays its informa-tion to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communi-cations between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the trans-mission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the commu-nications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RS s) to enable a UE 115 to estimate a DL channel. Similarly, a UE 115 may transmit sounding reference signals (SRSs) to enable a BS 105 to estimate a UL channel. Control infor-mation may include resource assignments and protocol controls. Data may include protocol data and/or operational data. In some embodiments, the BSs 105 and the UEs 115 may communicate using self-contained subframes. A self-contained subframe may include a portion for DL commu-nication and a portion for UL communication. A self-contained subframe can be DL-centric or UL-centric. A DL-centric subframe may include a longer duration for DL communication than for UL communication. A UL-centric subframe may include a longer duration for UL communi-cation than for UL communication.

In an embodiment, the network 100 may be an NR network deployed over a licensed spectrum. The BSs 105 can transmit synchronization signals (e.g., including a pri-mary synchronization signal (PSS) and a secondary syn-chronization signal (SSS)) in the network 100 to facilitate synchronization. The BSs 105 can broadcast system infor-mation associated with the network 100 (e.g., including a master information block (MIB), remaining minimum sys-tem information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broad-cast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). ABS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-U network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may acquire or reserve a TXOP or a channel occupancy time (COT) period in the shared channel by performing a CAT4 LBT. A CAT4 LBT refers to an LBT with a random backoff and a variable contention window. When the LBT passes, the BS 105 may communicate DL traffic to the UE 115 during the acquired COT period. The BS 105 may additionally share the acquired COT period with the UE 115 so that the UE 115 may transmit UL traffic to the BS 105 during the acquired COT period. The sharing of the COT period with the UE 115 can benefit UL traffic that are time-sensitive, such as channel-state-information (CSI) feedbacks and/or hybrid automatic repeat request (HARQ) acknowledgement/ negative-acknowledgement (ACK/NACK) feedbacks. After the UE 115 has completed a UL transmission, the BS 105 may transmit another DL traffic to the UE 115 or another UE 115. In other words, multiple communication link direction switches can occur within the acquired COT period.

After each link direction switch, the interference around a transmitting node (e.g., a BS 105 or a UE 115) may be different from the time when the COT period was initially acquired or from the time when the transmitting node last transmitted. One approach to ensuring that the channel is clear after a link direction switch is for the transmitting node to perform an LBT prior to transmitting after the link direction switch. In some instances, the transmitting node determines whether an LBT is required based on a duration of the link switch. For example, when the link switch duration is sufficiently short (e.g., less than a threshold of about 16 microseconds (µs)), the transmitting node may not be required to perform an LBT prior to a transmission after the link switch. However, when the link switch duration is long (e.g., greater than a threshold of about 16 µs), the transmitting node is required to perform an LBT and may transmit in the channel when the LBT passes.

In some embodiments, the decision to perform an LBT may additionally be dependent on the transmission duration after a link switch. For example, when a transmission subsequent to a link switch is longer than a certain duration threshold, a node may be required to perform an LBT even when the gap duration of the link switch is below the link switch gap threshold (e.g., less than 16 us). In case of a DL to UL switch, a UE 115 may not be aware of the total UL duration since different UEs 115 may be given different portions of the total UL duration and each UE 115 may be aware of the portion that is assigned to the UE 115. As such, the serving BS 105 can make a more informed decision than the UE 115 about the LBT type. Thus, the BS 105 may communicate the LBT type to the UE 115. In other words, the BS 105 may request the UE to perform an LBT even though the link switch gap duration may be less than the threshold for no-LBT. Mechanisms for defining a link switch duration, determining an LBT type or mode, and/or performing LBT measurements within the link switch duration are described in greater detail herein.

Figures 2, 3:
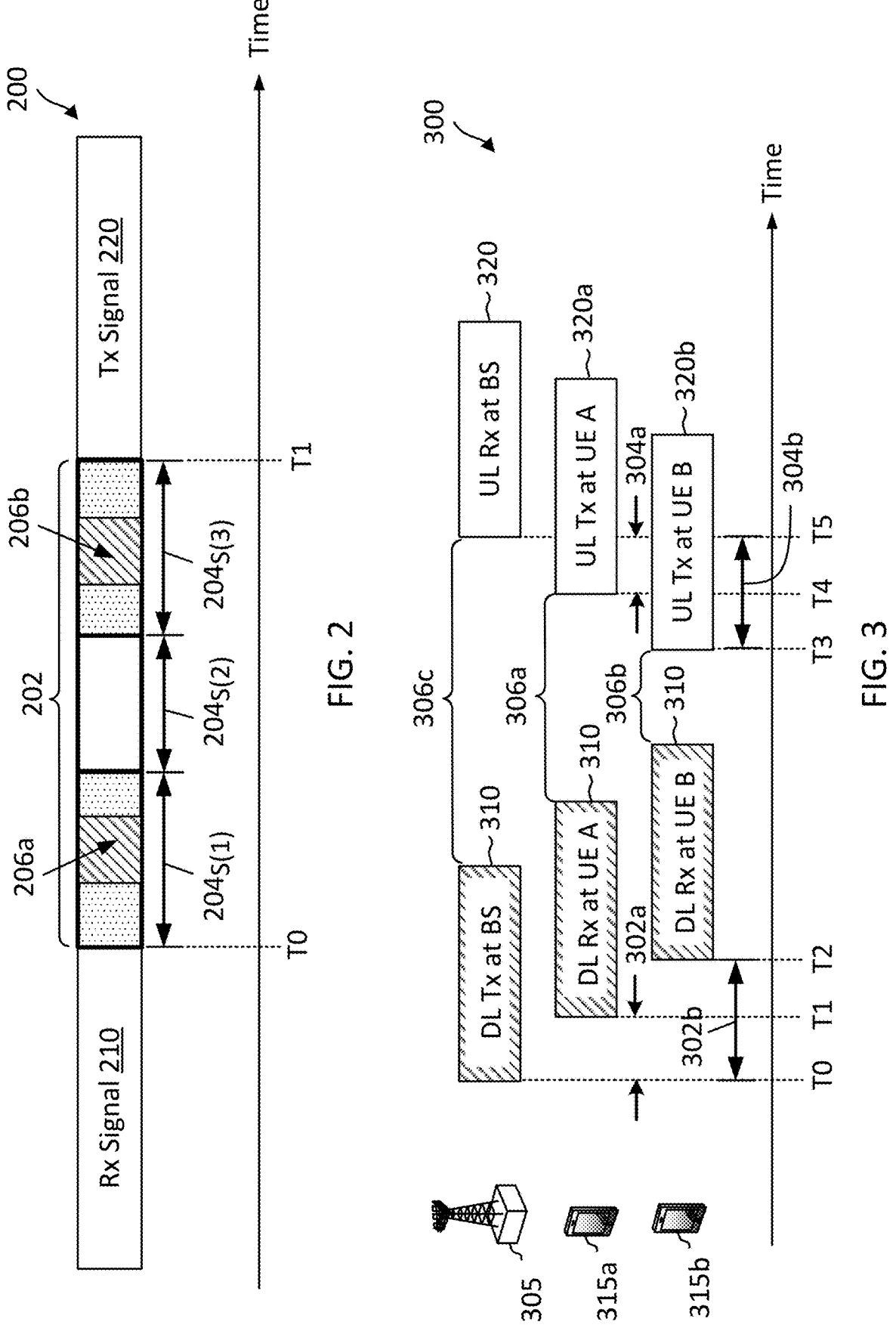
FIG. 2 is a timing diagram illustrating a listen-before-talk (LBT) measurement scheme according to some embodiments of the present disclosure.
FIG. 3 is a timing diagram illustrating transmission/reception timing in a wireless communication network according to some embodiments of the present disclosure.

FIG. 2 is a timing diagram illustrating an LBT measurement scheme 200 according to some embodiments of the present disclosure. The scheme 200 may be employed by a BS such as the BSs 105 and a UE such as the UEs 115 in a network such as the network 100. In particular, a BS or a UE may employ scheme 200 to determine measurement periods within a link switch duration for LBT measurements. In FIG. 2, the x-axis represents time in some constant units. As an example, a wireless communication device (e.g., a BS or a UE) receives a communication signal 210 (shown as Rx signal) and completes the reception at time T0 in a certain link direction (e.g., UL or DL). After receiving the communication signal 210, the wireless communication device switches to another link direction (e.g., UL-to-DL or DL-to-UL) and transmits a communication signal 220 (shown as Tx signal) starting at time T1. In an example, the wireless communication device corresponds to a BS, the communication signal 210 is an UL communication signal (e.g., including PUSCH data and/or PUCCH control information transmitted by a UE), and the communication signal 220 corresponds to a discovery reference signal (DRS) (e.g., including SSBs) or any DL communication signal including PDSCH data and/or PDCCH control information. In another example, the wireless communication device corresponds to a UE, the communication signal 210 is a DL communication signal (e.g., including PDSCH data and/or PDCCH control information transmitted by a BS), and the communication signal 220 corresponds to a scheduled UL transmission (e.g., including PUSCH data and/or PUCCH control information) in a COT acquired or reserved by the BS. The wireless communication device may perform an LBT (e.g., a CAT2 LBT) prior to transmitting the communication signal 220.

It should be noted that in some instances the switching gap can be longer than the duration of the measurement period considered for LBT. For example, the time or gap between a UL PUSCH transmission grant is transmitted in a DL direction and the UL PUSCH transmission start time may be as long as several ms, but the LBT may be performed for just a fixed duration (e.g., about 25 μs) prior to the PUSCH transmission. It should be noted that in some instances such fixed duration LBT procedures (CAT2 LBT) may be used without any switch in direction. For example, for DRS transmission, a BS may use a fixed duration (e.g., about 25 μs) LBT just prior to the DRS transmission.

The scheme 200 time-partitions a link switch gap duration 202 between the received communication signal 210 and the scheduled or upcoming transmit communication signal 220 or more generally the CAT2 LBT duration into about three slots 204 (shown as $204_{S(1)}$, $204_{S(2)}$, and $204_{S(3)}$). In an example, the link switch gap duration 202 may be about 25 μs, the slot $204_{S(1)}$ may have a duration of about 9 μs, the slot $204_{S(2)}$ may have a duration of about 7 μs, and the slot $204_{S(3)}$ may have a duration of about 9 μs. The scheme 200 allows LBT measurements during the slots $204_{S(1)}$ and $204_{S(3)}$, but not during the slot $204_{S(2)}$. Additionally, the scheme 200 requires an LBT measurement duration of at least 4 μs. LBT measurements may refer to energy detection or measurements.

In an example, the wireless communication device may determine whether the channel is available by performing energy detection during a measurement period 206a within the slot $204_{S(1)}$ and during a measurement period 206b within the slot $204_{S(3)}$. The wireless communication device measures channel energy for a duration of at least 4 μs to determine a channel status (e.g., idle or occupied). In other words, each of the measurement periods 206a and 206b may have a duration of at least 4 μs. The wireless communication device may select any 4 μs within the slots $204_{S(1)}$ and $204_{S(3)}$ for channel energy measurements and refrain from performing energy detection during the slot $204_{S(2)}$. In some examples, the wireless communication device may perform energy detection in a beginning portion of the slot $204_{S(1)}$ or the slot $204_{S(3)}$ and use the remaining time of the corresponding slots 204 for processing the energy measurement. An LBT is a pass when the measurements in the measurement periods 206a and 206b are below a certain energy detection threshold. Conversely, an LBT fails when the measurement in the measurement period 206a or the measurement in the measurement period 206b is equal to or greater than the energy detection threshold.

FIG. 3 is a timing diagram illustrating transmission/reception timing in a wireless communication network 300 according to some embodiments of the present disclosure. The network 300 may correspond to a portion of the network 100. In FIG. 3, the x-axis represents time in some constant units. FIG. 3 illustrates one BS 305 and two UEs 315 (shown as 315a and 315b) for purposes of simplicity of discussion, though it will be recognized that embodiments of the present disclosure may scale to many more UEs 315 and/or BSs 305. The BSs 305 and the UEs 315 may be similar to the BSs 105 and the UEs 115, respectively. The BS 305 may serve the UEs 315a and 315b in the network 300. The UE 315a may be located at a location closer to the BS 305 than the UE 315b.

The BS 305 may transmit a DL signal 310 (e.g., including PDSCH data and/or PDCCH control information) beginning at time T0. The DL signal 310 may arrive at the UE 315a at time T1 and arrive at the UE 315b at time T2. The time difference 302a between the transmission start time T0 at the BS 305 and the reception start time T1 at the UE 315a may be referred to as a propagation delay. Similarly, the time difference 302b between the transmission start time T0 at the BS 305 and the reception start time T2 at the UE 315b may be referred to as a propagation delay. The propagation delay 302b for the UE 315b is longer than the propagation delay 302a for the UE 315a since the UE 315b is further away from the BE 305 than the UE 315a.

In an example, the BS 305 may schedule the UE 315a for a UL transmission at time T5 based on a timeline maintained by the BS 305. The UE 315a may transmit a UL signal 320a (e.g., including PUSCH data and/or PUCCH control information) beginning at a time T4 earlier than the scheduled time T5 in order to compensate for the propagation delay 302a. The time difference 304a between the transmission time T4 at the UE 315a and the scheduled time T5 at the BS 305 is referred to as a timing advance. In another example, the BS 305 may schedule the UE 315b for a UL transmission at time T5 based on a timeline maintained by the BS 305. Similarly, the UE 315b may transmit a UL signal 320b beginning at a time T3 earlier than the schedule time T5 to compensate for the propagation delay 302b. The time difference 304b between the transmission time T3 at the UE 315b and the scheduled time T5 at the BS 305 is a timing advance for the UE 315b's UL transmissions.

In an example, the UE 315a or the 315b may perform an initial network access to establish a connection with the BS 305. The UE 315a or the UE 315b may initiate the network access by performing a random access procedure. During the random procedure, the UE 315a or the UE 315b can determine the timing advances 304a or 304b, respectively, based on random access preamble and messages exchanged with the BS 305. Accordingly, in some instances, the BS 305 may also determine the timing advances 304a or 304b based on the random access preamble and/or other UL transmissions the BS receives from the UE 315a, 315b and then communicates the determine timing advance to the UE 315a, 315b in subsequent messages As can be observed, the link switch gap (e.g., the gap durations 306a, 306b, 306c) may be different at different nodes due to different propagation delays and/or different timing advance at the nodes. Additionally, the gap durations for UL-to-DL switches at the BS 305 may be different from the gap durations for DL-to-UL switches at the UEs 315. As such, the link switch duration in a network may not always satisfy the 25 its duration as required by the scheme 200. Accordingly, the present disclosure provides techniques for defining link switch gap durations for LBT measurements and/or for determining an LBT type (e.g., CAT1 LBT, CAT2 LBT of different durations, or CAT4 LBT) after a link switch. Additionally, the present disclosure provides techniques for performing LBT measurements (e.g., CAT2 LBT of durations smaller than 25 μs) when a link switch gap is relatively short (e.g., less than about 25 μs).

Figure 4:
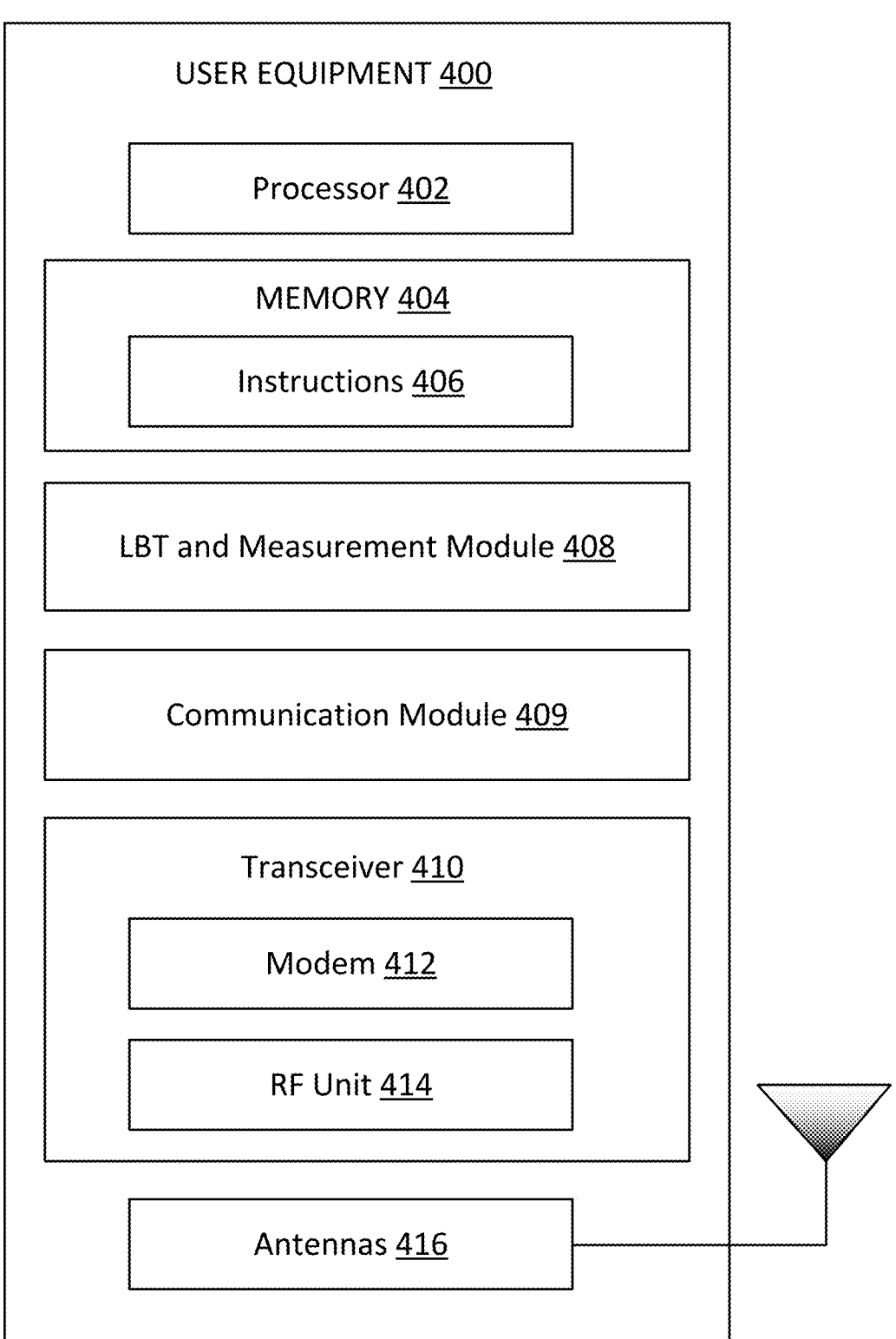
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 in the network 100 or a UE 315 in the network 300 as discussed above. As shown, the UE 400 may include a processor 402, a memory 404, an LBT and measurement module 408, a communication module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure, for example, aspects of FIGS. 6-24. Instructions 406 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the LBT and measurement module 408 and the communication module 409 may be implemented via hardware, software, or combinations thereof. For example, each of the LBT and measurement module 408 and the communication module 409 may be implemented as a processor, circuit, and/or instructions 406 stored in the memory 404 and executed by the processor 402. In some examples, the LBT and measurement module 408 and/or the communication module 409 can be integrated within the modem subsystem 412. For example, the LBT and measurement module 408 and/or the communication module 409 can be implemented by a combination of software components (e.g., executed by a DSP or a general processor) and hardware components (e.g., logic gates and circuitry) within the modem subsystem 412. In some examples, a UE may include the LBT and measurement module 408 or the communication module 409. In other examples, a UE may include the LBT and measurement module 408 and the communication module 409.

The LBT and measurement module 408 and the communication module 409 may be used for various aspects of the present disclosure, for example, aspects of FIGS. 6-24. For example, the LBT and measurement module 408 is configured to determine a link switch gap duration after a link switch, determine an LBT type or mode based on the link switch gap duration, determine an LBT measurement (e.g., energy detection) based on the link switch gap duration, and/or perform an LBT based on the determined LBT type and/or the LBT measurement. In an example, the LBT and measurement module 408 may determine the link switch gap duration based on timing maintained at a serving BS (e.g., the BSs 105 and 305).

In an example, the LBT and measurement module 408 may determine the link switch gap duration based on an absolute transmission end time before the switch and an absolute transmission start time after the switch. It should be noted that the transmission start time refers to the planned, scheduled, or expected start time of the transmission after the link switch. The transmission may or may not occur depending on the LBT results. For example, the UE 400 may not proceed with the transmissions in case of an LBT failure. In an example, the LBT and measurement module 408 may determine the link switch gap duration based on timing maintained at the UE 400. In an example, the LBT and measurement module 408 may consider channel delay spread, multi-path channel parameter, a timing advance, and/or a propagation delay in the channel when determining the link switch gap duration. Mechanisms for determining a link switch gap duration are described in greater detail herein.

In an example, the LBT and measurement module 408 may time-partition a link switch gap duration into about three slots (e.g., the slots 204) and may perform energy detection in a measurement period (e.g., the measurement period 206*a*) within a beginning portion (e.g., the slot 204$_{S(1)}$) of the link switch gap duration and in a measurement period (e.g., the measurement period 206*b*) within an end portion (e.g., the slot 204$_{S(3)}$) of the link switch gap duration and refrain from performing channel energy measurements in a middle portion (e.g., the slot 204$_{S(2)}$) of the link switch gap duration between the beginning portion and the end portion. When the link switch gap duration is short (e.g., less than about 25 µs), the LBT and measurement module 408 may use a predetermined duration for one or more of the portions and allows one or more other portions of the link switch gap duration to vary according to the link switch gap duration. Alternatively, the LBT and measurement module 408 may exclude any one of the portions to fit the measurement periods into the available link switch gap duration. Mechanisms for performing LBT measurements are described in greater detail herein.

The communication module 409 is configured to receive an LBT configuration and/or a cyclic extension configuration from a BS (e.g., the BSs 105 and 305), coordinate with the LBT and measurement module 408 for link switches, LBTs, signal receptions, and/or transmissions, apply a cyclic extension (e.g., ECP or cyclic postfix) to a UL transmission, and/or determine a length or duration for the cyclic extension to provide a desired or required link switch gap duration, as described in greater detail herein.

As shown, the transceiver 410 may include the modem subsystem 412 and the RF unit 414. The transceiver 410 can be configured to communicate bi-directionally with other devices, such as the BSs 105 and 305. The modem subsystem 412 may be configured to modulate and/or encode the data from the memory 404, the LBT and measurement module 408, and/or the communication module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
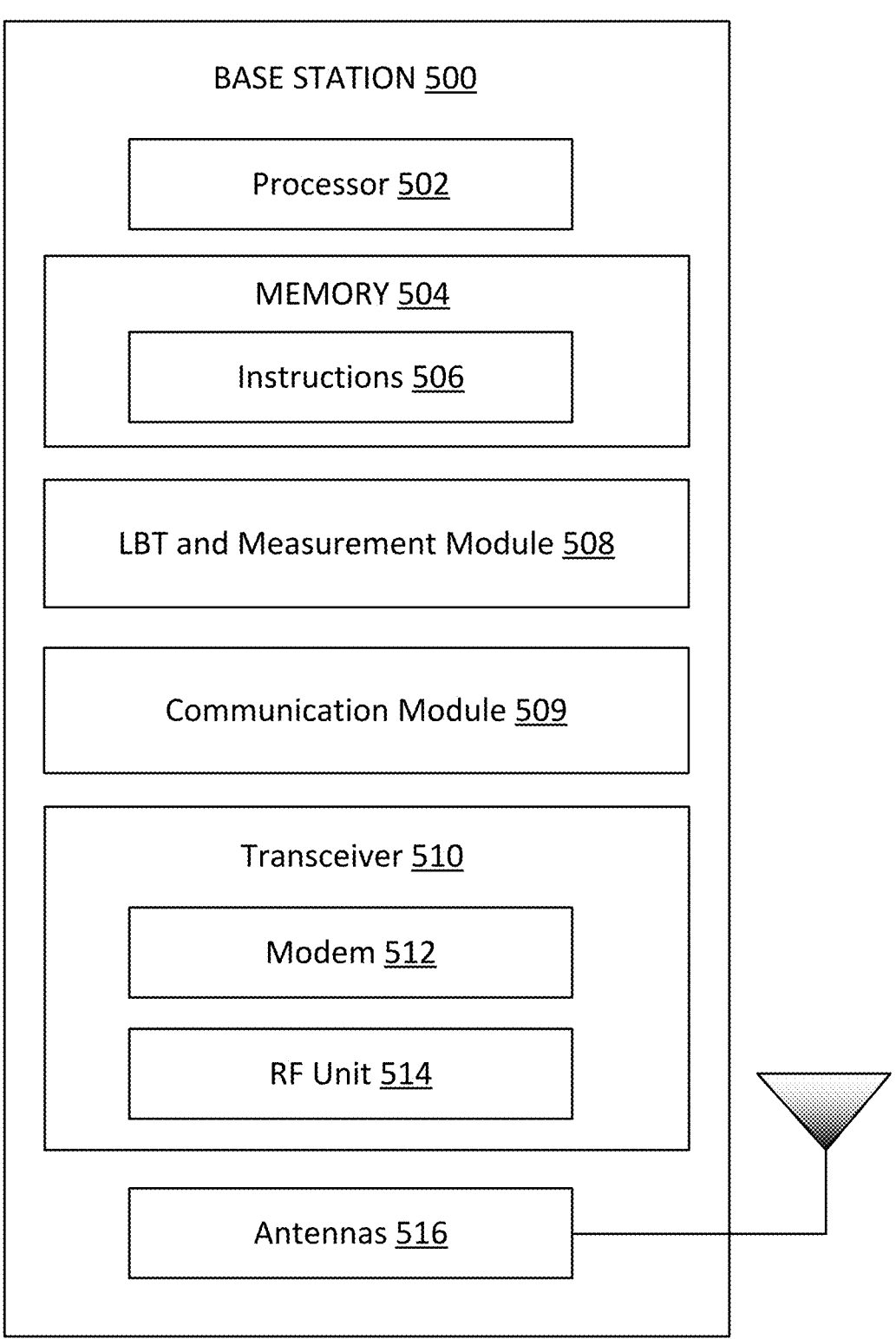
FIG. 5 is a block diagram of an exemplary base station (BS) according to some embodiments of the present disclosure.

FIG. 5 is a block diagram of an exemplary BS 500 according to embodiments of the present disclosure. The BS 500 may be a BS 105 in the network 100 or a BS 305 in the network 300 as discussed above. A shown, the BS 500 may include a processor 502, a memory 504, an LBT and measurement module 508, a communication module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIG. 6-24. Instructions 506 may also be referred to as code, which may be interpreted broadly to include any type of computer-readable statement(s) as discussed above with respect to FIG. 4.

Each of the LBT and measurement module 508 and the communication module 509 may be implemented via hardware, software, or combinations thereof. For example, each of the LBT and measurement module 508 and the communication module 509 may be implemented as a processor, circuit, and/or instructions 506 stored in the memory 504 and executed by the processor 502. In some examples, the LBT and measurement module 508 and/or the communication module 509 can be integrated within the modem subsystem 512. For example, the LBT and measurement module 508 and/or the communication module 509 can be implemented by a combination of software components (e.g., executed by a DSP or a general processor) and hardware components (e.g., logic gates and circuitry) within the modem subsystem 512. In some examples, a UE may include the LBT and measurement module 508 or the communication module 509. In other examples, a UE may include the LBT and measurement module 508 and the communication module 509.

The LBT and measurement module 508 and the communication module 509 may be used for various aspects of the present disclosure, for example, aspects of FIGS. 6-24. For example, the LBT and measurement module 508 is configured to determine a link switch gap duration after a link switch, determine an LBT type or mode based on the link switch gap duration, determine an LBT measurement (e.g., energy detection) based on the link switch gap duration, and/or perform an LBT based on the determined LBT type and/or the LBT measurement.

In an example, the LBT and measurement module 508 may determine the link switch gap duration based on timing maintained at a UE (e.g., the UEs 115 and 315). In an example, the LBT and measurement module 508 may determine the link switch gap duration based on absolute transmission end time of signal prior to the switch and transmission start time of signal after the switch in the channel. In an example, the LBT and measurement module 508 may determine the link switch gap duration based on timing maintained at the BS 500. In an example, the LBT and measurement module 508 may consider channel delay spread, multi-path channel parameter, a timing advance, and/or a propagation delay in the channel when determining the link switch gap duration. Mechanisms for determining a link switch gap duration are described in greater detail herein.

In an example, the LBT and measurement module 508 may time-partition a link switch gap duration into about three slots (e.g., the slots 204) and may perform energy detection in a measurement period (e.g., the measurement period 206a) within a beginning portion (e.g., the slot $204_{S(1)}$) of the link switch gap duration and in a measurement period (e.g., the measurement period 206b) within an end portion (e.g., the slot $204_{S(3)}$) of the link switch gap duration and refrain from performing channel energy measurements in a middle portion (e.g., the slot $204_{S(2)}$) of the link switch gap duration between the beginning portion and the end portion. When the link switch gap duration is short (e.g., less than about 25 μs), the LBT and measurement module 508 may use a predetermined duration for one or more of the portions and allows one or more other portions of the link switch gap duration to vary according to the link switch gap duration. Alternatively, the LBT and measurement module 508 may exclude any one of the portions to fit the measurement periods into the available link switch gap duration. Mechanisms for performing LBT measurements are described in greater detail herein.

The communication module 509 is configured to transmit an LBT configuration and/or a cyclic extension configuration to a UE (e.g., the UEs 115 and 315), coordinate with the LBT and measurement module 508 for link switches, LBTs, signal receptions, and/or transmissions, apply a cyclic extension (e.g., ECP or cyclic postfix) to a DL transmission, and/or determine a length or duration for the cyclic extension to provide a desired or required link switch gap duration, as described in greater detail herein.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115, 315, or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 500 to enable the BS 500 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

FIGS. 6-9 illustrate various mechanisms for determining a link switch gap duration. In FIGS. 6-9, the schemes 600-900 may be employed by a wireless communication device such as the BSs 105 and 500 and the UEs 115 and 400 in a network such as the network 100. In particular, a wireless communication device may employ the schemes 600, 700, 800, and/or 900 to determine a link switch gap duration for LBT measurements and/or an LBT type after a link switch. Additionally, the x-axes represent time in some constant units.

Figures 6, 7:
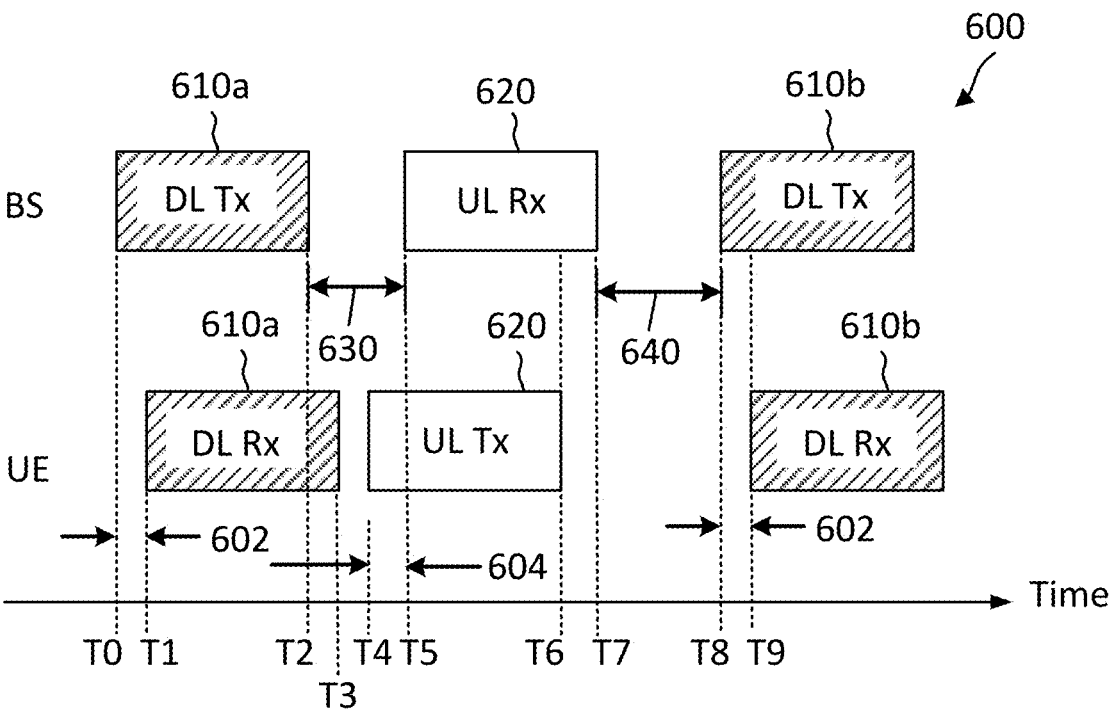
FIG. 6 is a timing diagram illustrating a link switch gap determination scheme according to some embodiments of the present disclosure.
FIG. 7 is a timing diagram illustrating a link switch gap determination scheme according to some embodiments of the present disclosure.

FIG. 6 is a timing diagram illustrating a link switch gap determination scheme 600 according to some embodiments of the present disclosure. In the scheme 600, the BS starts to transmit a DL signal 610a at time T0 (shown as DL Tx) to a UE and completes the transmission of the DL signal 610a at time T2. After a propagation delay 602, the DL signal 610a arrives at the UE at time T1 (shown as DL Rx). The UE completes the reception of at least a first path (received earliest in time) of the DL signal 610a at time T3. The BS schedules the UE for a UL transmission beginning at time T5. The time T0, T2, and T5 are with reference to the BS's timeline or slot timing definitions (maintained at the BS).

At time T4, the UE starts to transmit a UL signal 620 (shown as UL Tx) according to the schedule and a timing advance 604 for communicating with the BS. The UE completes the transmission of the UL signal 620 at time T6. After a propagation delay, the UL signal 620 arrives at the BS at the time T5 as scheduled by the BS (shown as UL Rx). The BS completes the reception of at least the first path of the UL signal 620 at time T7. After receiving the UL signal 620, the BS starts to transmit another DL signal 610b to the UE at time T8 (shown as DL Tx). After a propagation delay 602, the DL signal 610b arrives at the UE at time T9 (shown as DL Rx). The DL signals 610 are similar to the DL signals 310. The UL signals 620 are similar to the UL signals 320.

The scheme 600 defines a link switch gap duration based on the BS's timeline or slot timing definitions. As shown, a DL-to-UL switch duration 630 is defined as a duration between the transmission end time (e.g., time T2) of the DL signal 610a at the BS and the expected reception start time (e.g., time T5) of the UL signal 620 at the BS. A UL-to-DL switch duration 640 is defined as a duration between the expected reception end time (e.g., time T7) of the UL signal 620 at the BS and the scheduled transmission start time (e.g., time T8) of the DL signal 610b at the BS.

FIG. 7 is a timing diagram illustrating a link switch gap determination scheme 700 according to some embodiments of the present disclosure. The scheme 700 is illustrated using the same DL and UL transmissions timeline as in the scheme 600, and may use the same reference numerals as in FIG. 6 for simplicity's sake. However, the scheme 700 defines a link switch gap duration based on an absolute time gap between the end of a transmission in one link direction and the start of a transmission in another link direction. In other words, the scheme 700 takes timing advance into account when determining a link switch gap duration.

As shown, a DL-to-UL switch duration 730 is defined as a duration between the transmission end time (e.g., time T2) of the DL signal 610a at the BS and the transmission start time (e.g., time T4) of the UL signal 620 at the UE. A UL-to-DL switch duration 740 is defined as a duration between the transmission end time (e.g., time T6) of the UL signal 620 at the UE and the transmission start time (e.g., time T8) of the DL signal 610b at the BS. Thus, the UE may determine the DL-to-UL switch duration 730 by determining the DL-to-UL switch duration 630 (e.g., using the scheme 600) and subtracting the timing advance 604 from the DL-to-UL switch duration 630. The BS may determine the UL-to-DL switch duration 740 by determining the UL-to-DL switch duration 640 (e.g., using the scheme 600) and adding the timing advance 604 to the UL-to-DL switch duration 640. In some instances, the BS may not have knowledge of the exact timing advance 604 and may instead use a maximum timing advance parameter for determining the UL-to-DL switch duration 740.

Figure 8:
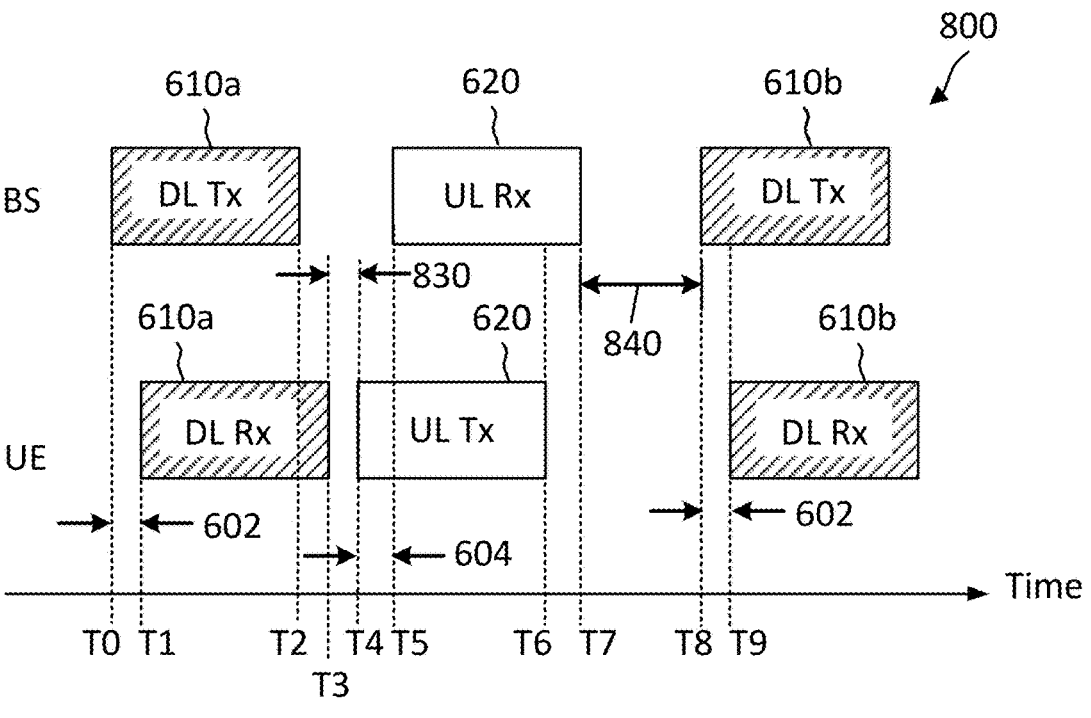
FIG. 8 is a timing diagram illustrating a link switch gap determination scheme according to some embodiments of the present disclosure.

FIG. 8 is a timing diagram illustrating a link switch gap determination scheme 800 according to some embodiments of the present disclosure. The scheme 800 is illustrated using the same DL and UL transmissions timeline as in the scheme 600, and may use the same reference numerals as in FIG. 6 for simplicity's sake. However, the scheme 800 defines a link switch gap duration based on a reception end time and a transmission start time at a transmitting node. As shown, a DL-to-UL switch duration 830 is defined as a duration between the reception end time (e.g., time T3) of the DL signal 610a at the UE and the transmission start time (e.g., time T4) of the UL signal 620 at the UE. A UL-to-DL switch duration 840 is defined as a duration between the reception end time (e.g., time T7) of the UL signal 620 at the BS and the transmission start time (e.g., time T8) of the DL signal 610b at the BS. As can be observed, UL-to-DL switch duration 840 is the same as the UL-to-DL switch duration 640 in the scheme 600.

In some examples, the BS and the UE may be communicating over a multi-path channels, where a signal may be received via multiple paths with different path-delays. In other words, the UE may receive multiple DL signals 610a at different time via different paths. Similarly, the BS may receive multiple UL signals 620 at different time via different paths. Thus, the UE may determine the DL-to-UL switch duration 830 based on a DL signal 610*a* with an earliest arrival time via a first path, a latest arrival time via a last path, or a received path that satisfies a certain threshold (e.g., the received DL signal with a signal strength above the threshold), or a strongest received path (e.g., the received DL signal with the greatest signal strength). Similarly, the BS may determine the UL-to-DL switch duration 840 based on a first received path (e.g., providing an earliest received time), a last received path, a received path meeting a certain threshold, or a strongest received path. In some examples, the UE may determine the DL-to-UL switch duration 830 based on a transmission time of the DL signal 610*a* at the BS and the timing advance 604.

Figure 9:
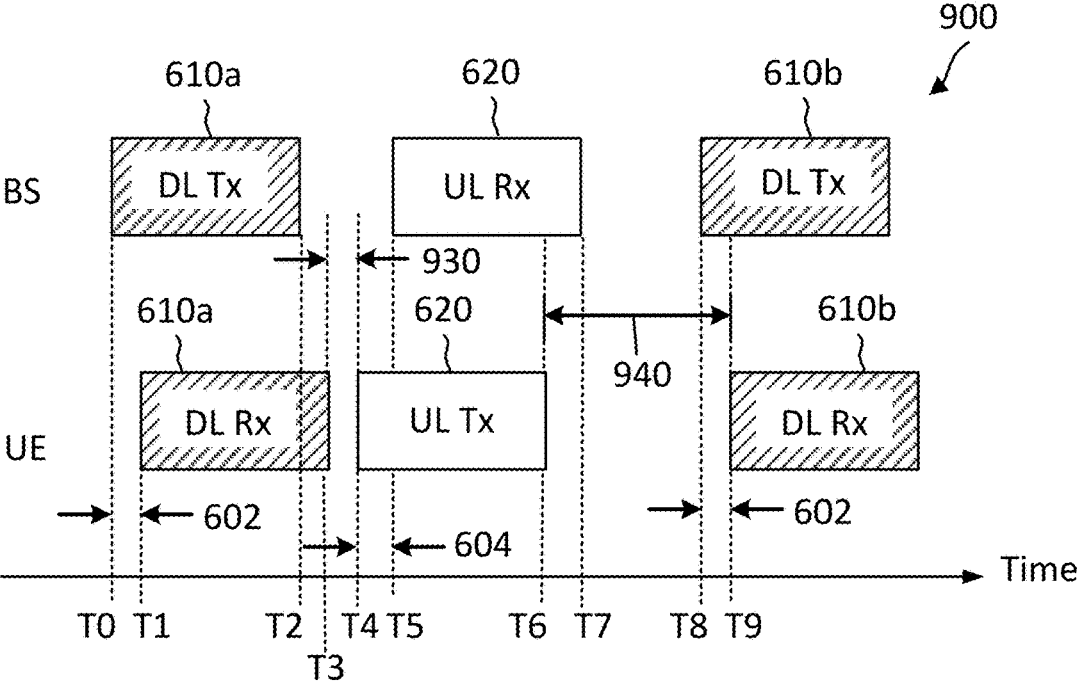
FIG. 9 is a timing diagram illustrating a link switch gap determination scheme according to some embodiments of the present disclosure.

FIG. 9 is a timing diagram illustrating a link switch gap determination scheme 900 according to some embodiments of the present disclosure. The scheme 900 is illustrated using the same DL and UL transmissions timeline as in the scheme 600, and may use the same reference numerals as in FIG. 6 for simplicity's sake. However, the scheme 900 defines a link switch gap duration based on a timeline of the UE. As shown, a DL-to-UL switch duration 930 is defined as a duration between the reception end time (e.g., time T3) of the DL signal 610*a* at the UE and the transmission start time (e.g., time T4) of the UL signal 620 at the UE. A UL-to-DL switch duration 840 is defined as a duration between the transmission end time (e.g., time T7) of the UL signal 620 at the UE and the reception start time (e.g., time T9) of the DL signal 610*b* at the UE. As can be observed, the DL-to-UL switch duration 930 is the same as the DL-to-UL switch duration 830 in the scheme 800.

In an embodiment, a UE or a BS may include a channel delay margin in a DL-to-UL switch duration (e.g., the DL-to-UL switch duration 630, 730, 830, or 930) or in a UL-to-DL switch duration (e.g., the UL-to-DL switch duration 640, 740, 840, or 940) when applying the schemes 600, 700, 800, and/or 900 described above. As an example, when the UE employs the scheme 700, the UE may determine the DL-to-UL switch duration 730 by further subtracting a channel delay spread parameter or margin from the DL-to-UL switch duration 730. In some instances, the channel delay spread parameter can be configurable (e.g., by the BS).

In an embodiment, different link switch gap determination schemes may be selected for different nodes. For example, a BS may implement the scheme 600 to determine whether a CAT2 LBT is required and/or to perform the CAT2 LBT measurements, whereas a UE may implement the scheme 800 to determine whether a CAT2 LBT is required and/or to perform the CAT2 LBT measurements. Mechanisms for LBT measurements are described in greater detail herein.

In some embodiments, the BS may select a link switch gap determination scheme for the UE. For example, the BS may signal a link switch gap determination configuration in an RRC message, a MAC CE message, and/or a PDCCH DCI message (e.g., carried in a scheduling grant). In response, the UE may determine whether an LBT is required after a link switch or which type of LBT to perform after a link switch based on a gap duration determined according to the configuration received from the BS. In some embodiments, the BS may further configure the UE with an LBT type via an RRC message, a MAC CE message, and/or a PDCCH DCI message.

In some embodiments, a BS or a UE may use different link switch gap definitions or different schemes (e.g., the schemes 600, 700, 800, and/or 900) for determining an LBT type and for determining LBT measurement windows. For example, a UE may apply the scheme 700 to determine a link switch gap duration for LBT measurement window determination and may apply the scheme 600 to determining a link switch gap duration for LBT type determination. In general, a node may use a link switch gap duration that may result in a shorter duration for LBT measurement window determination than for LBT type determination. In some embodiments, a BS or a UE may further include different channel delay spread margins for LBT type determination and LBT measurement window determination.

In an embodiment, a transmitting node (e.g., a BS or a UE) may determine a link switch gap duration for LBT measurements such that the link switch gap duration is adjacent to the transmission start time at the transmitting node. In an example, a DL-to-UL switch gap duration may end just before the start of the next transmission (e.g., the time T4 in schemes 600, 700, 800, and 900) at the transmitting UE. In another example, a DL-to-UL switch gap duration may end just before the expected reception time at the BS (e.g., at the time T5 in the schemes 600, 700, 800, and 900) with reference to the BS's timeline, where the gap duration may overlap with the UE's timing advance (e.g., the timing advance 604). It should be noted that when the timing advance time overlaps with the measurement time, the UE may have less time for processing.

In an embodiment, when a measurement gap duration is equal to about 25 μs, a transmitting node may apply the scheme 200 for LBT measurements. When a measurement gap duration is greater than 25 μs, a transmitting node may cap the measurement gap duration to about 25 μs and apply the scheme 200 for LBT measurements.

FIGS. 10-19 illustrate various mechanisms for determining LBT measurement windows when a link switch gap duration (e.g., the durations 630, 640, 730, 740, 830, 840, 930, or 940) is less than about 25 μs. In FIGS. 10-19, the schemes 1000-1900 may be employed by a wireless communication device such as the BSs 105 and 500 and the UEs 115 and 400 in a network such as the network 100. In particular, a wireless communication device may employ the schemes 1000, 1100, 1200, 1300, 1400, 15001600, 1700, 1800, and/or 1900 to determine LBT measurement windows within a link switch gap duration for LBT measurement. Additionally, the x-axes represent time in some constant units. Further, the scheme 1000, 1100, 1200, 1300, 1400, 1500, 1600, 1700, 1800, and/or 1900 are illustrated using a similar link switch scenario as in the scheme 200, and may use the same reference numerals as in FIG. 2 for simplicity's sake. However, the schemes 1000, 1100, 1200, 1300, 1400, 1500, 1600, 1700, 1800, and/or 1900 have a link switch gap duration shorter than about 25 μs.

Figure 10:
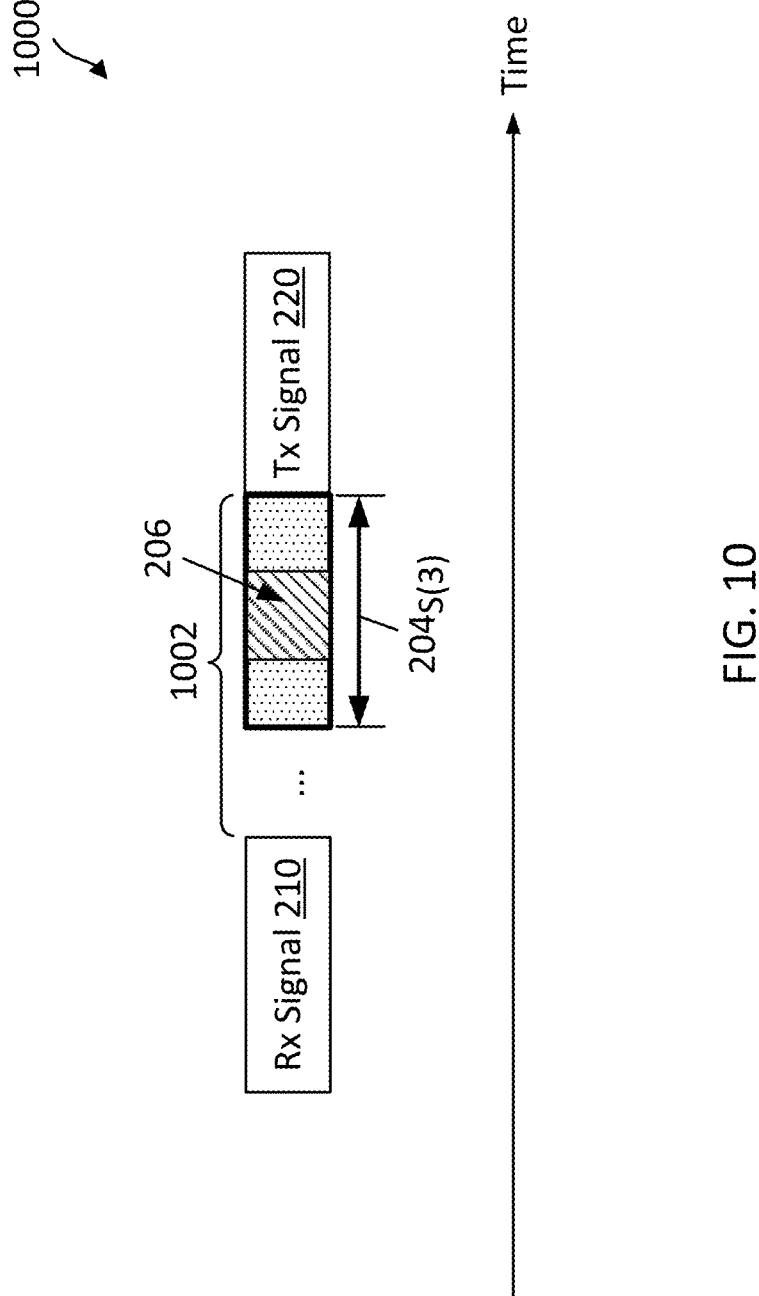
FIG. 10 is a timing diagram illustrating an LBT measurement scheme for variable link switch gap durations according to some embodiments of the present disclosure.

FIG. 10 is a timing diagram illustrating an LBT measurement scheme 1000 for variable link switch gap durations according to some embodiments of the present disclosure. In the scheme 1000, a transmitting node may perform a single LBT measurement towards the end of a link switch gap duration when the link switch gap duration is shorter than a predetermined period. For example, a node (e.g., a BS or a UE) receives a communication signal 210 in one direction at time T0. The node switches to transmit a communication signal 220 in another direction at time T1. The node may determine a link switch gap duration 1002 by employing the scheme 600, 700, 800, and/or 900 described above with respect to FIGS. 6, 7, 8, and/or 9, respectively. The node may perform a single LBT measurement (e.g., channel energy detection) in a measurement period 206 (e.g., with a minimum duration of about 4 μs) within a slot 204$_{S(3)}$ (e.g., with a duration of about 9 μs) towards the end of the link switch gap duration 1002. The node may determine that the LBT is a pass when the detected energy is below a certain threshold.

The node may determine that the LBT fails when the detected energy is above a certain threshold.

Figures 11, 12:
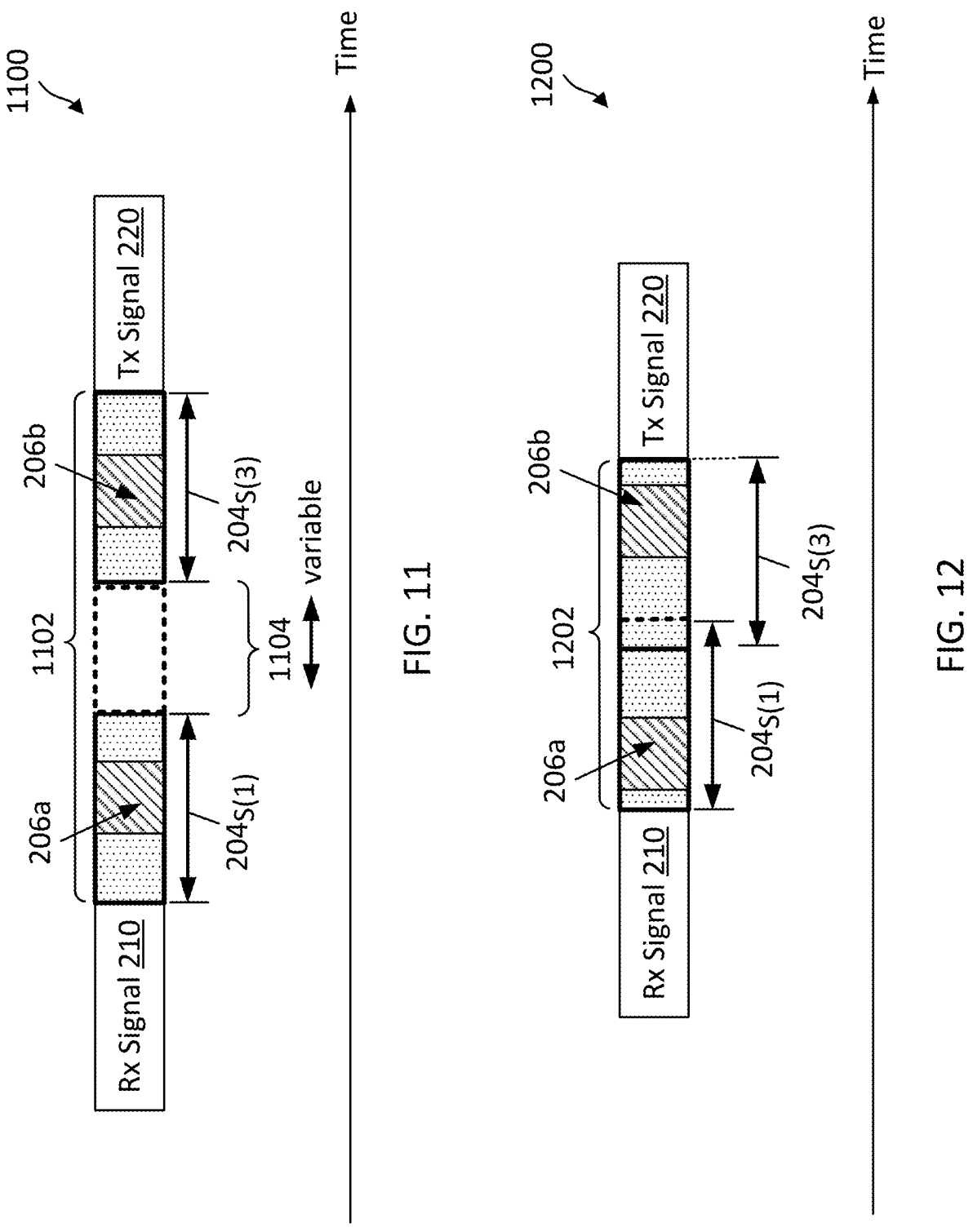
FIG. 11 is a timing diagram illustrating an LBT measurement scheme for variable link switch gap durations according to some embodiments of the present disclosure.
FIG. 12 is a timing diagram illustrating an LBT measurement scheme for variable link switch gap durations according to some embodiments of the present disclosure.

FIG. 11 is a timing diagram illustrating an LBT measurement scheme 1100 for variable link switch gap durations according to some embodiments of the present disclosure. Similar to the scheme 200, the scheme 1100 time-partitions a link switch gap duration 1102 into three slots $204_{S(1)}$, $204_{S(2)}$, and $204_{S(3)}$ and LBT measurements may be performed during LBT measurement periods 206a and 206b within the slots $204_{S(1)}$ and $204_{S(3)}$, respectively. To accommodate a shorter link switch gap duration 1102, the scheme 1100 maintains a duration of about 9 μs for the slot $204_{S(1)}$ at the beginning of the link switch gap duration 1102 (e.g., after or adjacent to the communication signal 210) and the slot $204_{S(3)}$ towards the end of the link switch gap duration 1102 (e.g., immediately before or adjacent to the communication signal 220, but allows the slot $204_{S(2)}$ between the slots $204_{S(1)}$ and $204_{S(3)}$ to have a variable duration 1104 depending on the length of the link switch gap duration 1102. For example, the duration 1104 may be between about 0 μs to about 7 μs, where no LBT measurement is allowed. The node may determine that the LBT is a pass when the detected energy in both the measurement periods 206a and 206b are below a certain threshold. The node may determine that the LBT fails when the detected energy in any one of the measurement period 206a and/or 206b is above a certain threshold.

FIG. 12 is a timing diagram illustrating an LBT measurement scheme 1200 for variable link switch gap durations according to some embodiments of the present disclosure. The scheme 1200 is similar to the scheme 1100 and illustrates a scenario when the duration 1104 of the slot $204_{S(2)}$ becomes negative. In other words, the slots $204_{S(1)}$ and $204_{S(3)}$ may be partially overlapping in time, for example, when the link switch gap duration 1202 between the communication signals 210 and 220 in the scheme 1200 is shorter than about 18 μs. While the slots $204_{S(1)}$ and $204_{S(3)}$ may be partially overlapping, the scheme 1200 requires LBT measurements to be performed during the measurement period 206a (e.g., at least 4 μs long) within the slot $204_{S(1)}$ and during the measurement period 206b (e.g., at least 4 μs long) within the slot $204_{S(3)}$. Similar to the scheme 1100, the node may determine that the LBT is a pass when the detected energy in both the measurement periods 206a and 206b are below a certain threshold. The node may determine that the LBT fails when the detected energy in any one of the measurement period 206a and/or 206b is above a certain threshold.

In an example, a node performing the LBT may select the measurement periods 206a and 206b within the slots $204_{S(1)}$ and $204_{S(3)}$, respectively, such that the measurement periods 206a and 206b are non-overlapping in time. In an example, a node performing the LBT may select the measurement periods 206a and 206b within the slots $204_{S(1)}$ and $204_{S(3)}$, respectively, such that the measurement period 206a is before the start of the slot $204_{S(3)}$ or such that the measurement period 206b is after the end of the slot $204_{S(1)}$.

Figures 13, 14, 15:
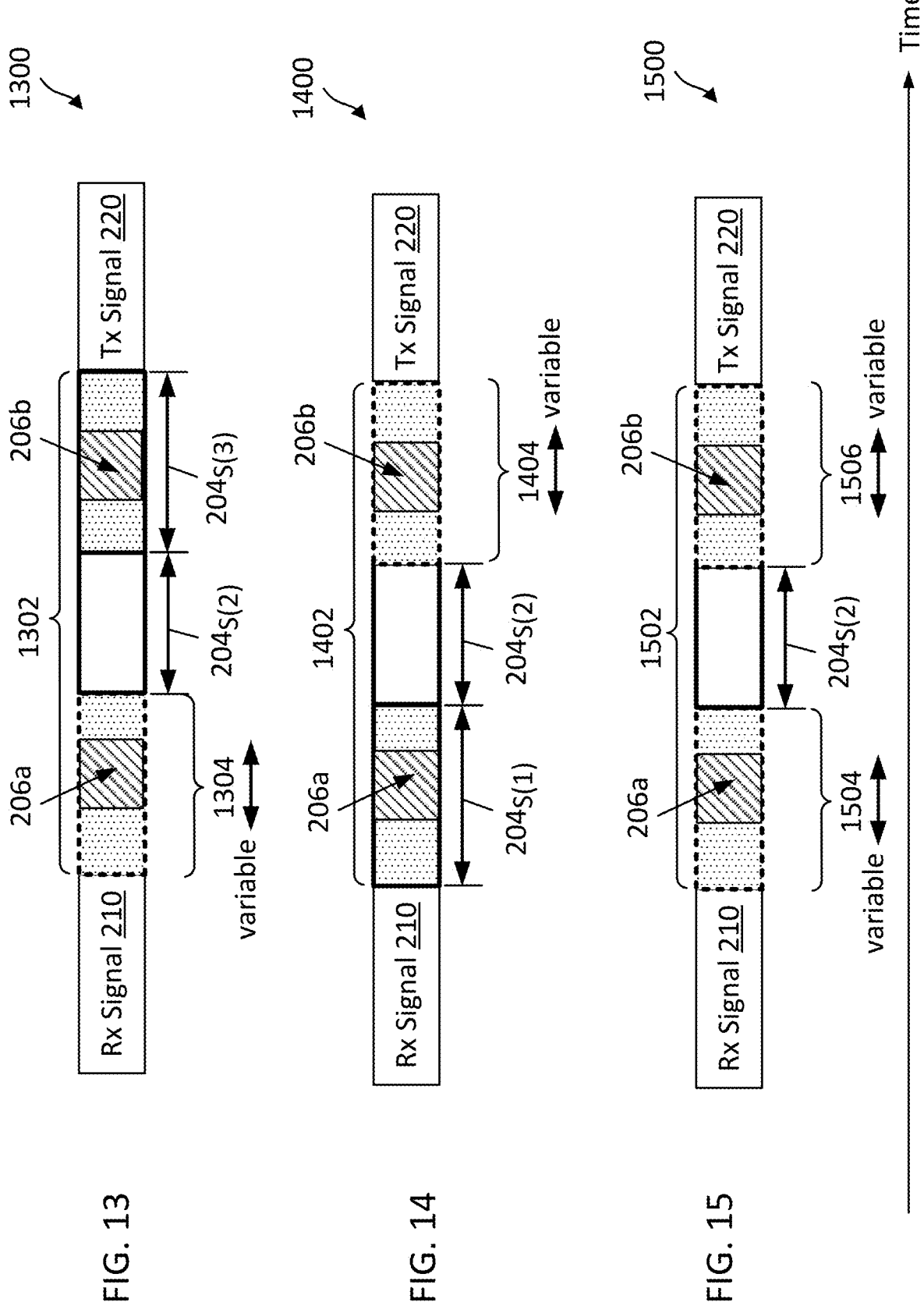
FIG. 13 is a timing diagram illustrating an LBT measurement scheme for variable link switch gap durations according to some embodiments of the present disclosure.
FIG. 14 is a timing diagram illustrating an LBT measurement scheme for variable link switch gap durations according to some embodiments of the present disclosure.
FIG. 15 is a timing diagram illustrating an LBT measurement scheme for variable link switch gap durations according to some embodiments of the present disclosure.

FIG. 13 is a timing diagram illustrating an LBT measurement scheme 1300 for variable link switch gap durations according to some embodiments of the present disclosure. Similar to the scheme 200, the scheme 1300 time-partitions a link switch gap duration 1302 into three slots $204_{S(1)}$, $204_{S(2)}$, and $204_{S(3)}$ and LBT measurements may be performed during LBT measurement periods 206a and 206b within the slots $204_{S(1)}$ and $204_{S(3)}$, respectively. To accommodate a shorter link switch gap duration 1302, the scheme 1300 maintains a duration of about 9 μs for the slot $204_{S(3)}$ towards the end of the link switch gap duration 1302 and a duration of about 7 μs for the slot $204_{S(2)}$, but allows the slot $204_{S(1)}$ at the beginning of the link switch gap duration 1302 to have a variable duration 1304 depending on the length of the link switch gap duration 1302. For example, the duration 1304 may be between about 4 μs to about 9 μs.

In an embodiment, the node may perform an LBT measurement for a measurement period 206a of at least 4 μs in the slot $204_{S(1)}$ and another LBT measurement for a measurement period 206b of at least 4 μs in the slot $204_{S(3)}$. The node may determine that the LBT is a pass when the detected energy in both the measurement periods 206a and 206b are below a certain threshold. The node may determine that the LBT fails when the detected energy in any one of the measurement period 206a and/or 206b is above a certain threshold.

In an embodiment, when the duration 1304 is less than 4 μs, the scheme 1300 may allow an LBT measurement to be less than about 4 μs.

FIG. 14 is a timing diagram illustrating an LBT measurement scheme 1400 for variable link switch gap durations according to some embodiments of the present disclosure. The scheme 1400 is substantially similar to the scheme 1300. However, to accommodate a shorter link switch gap duration 1402, the scheme 1400 maintains a duration of about 9 μs for the slot $204_{S(1)}$ at the beginning of the link switch gap duration 1402 and allows the slot $204_{S(3)}$ towards the end of the link switch gap duration 1402 to have a variable duration 1404 depending on the length of the link switch gap duration 1402. Similar to the scheme 1300, in one example, the scheme 1400 may require an LBT measurement of at least 4 μs in each of the measurement periods 206a and 206b. In another example, the scheme 1400 may allow an LBT measurement that is less than about 4 μs in the slot $204_{S(3)}$ when the duration 1404 is less than 4 μs. Similar to the schemes 1100, 1200, and 1300, the node may determine that the LBT is a pass when the detected energy in both the measurement periods 206a and 206b are below a certain threshold. The node may determine that the LBT fails when the detected energy in any one of the measurement period 206a and/or 206b is above a certain threshold.

FIG. 15 is a timing diagram illustrating an LBT measurement scheme 1500 for variable link switch gap durations according to some embodiments of the present disclosure. Similar to the schemes 1300 and 1400, to accommodate a shorter link switch gap duration 1502, the scheme 1500 maintains a duration of about 7 μs for the slot $204_{S(2)}$, but allows the slot $204_{S(1)}$ at the beginning of the link switch gap duration 1502 and the slot $204_{S(3)}$ towards the end of the link switch gap duration to have variable durations 1504 and 1506, respectively, depending on the length of the link switch gap duration 1502. In an example, the scheme 1500 may require an LBT measurement of at least 4 μs in each of the measurement periods 206a and 206b. In another example, the scheme 1500 may allow an LBT measurement that is less than about 4 μs in the slot $204_{S(3)}$ when the duration 1504 or 1506 is less than 4 μs. Similar to the schemes 1100, 1200, 1300, and 1400 the node may determine that the LBT is a pass when the detected energy in both the measurement periods 206a and 206b are below a certain threshold. The node may determine that the LBT fails when the detected energy in any one of the measurement period 206a and/or 206b is above a certain threshold.

Figure 16:
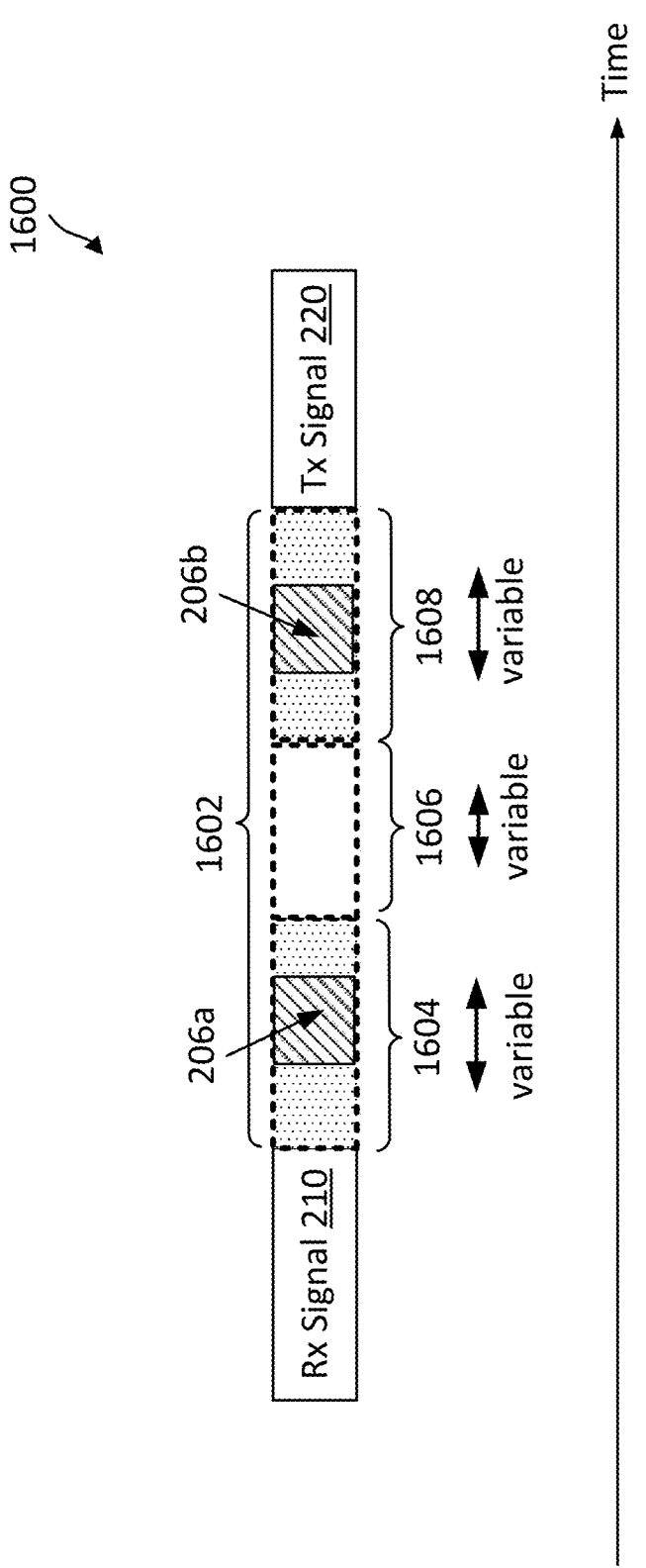
FIG. 16 is a timing diagram illustrating an LBT measurement scheme for variable link switch gap durations according to some embodiments of the present disclosure.

FIG. 16 is a timing diagram illustrating an LBT measurement scheme 1600 for variable link switch gap durations according to some embodiments of the present disclosure. Similar to the scheme 200, the scheme 1600 time-partitions a link switch gap duration 1602 into three slots 204$_{S(1)}$, 204$_{S(2)}$, and 204$_{S(3)}$ and LBT measurements may be performed during LBT measurement periods 206*a* and 206*b* within the slots 204$_{S(1)}$ and 204$_{S(3)}$, respectively. To accommodate a shorter link switch gap duration, the scheme 1600 scales each of the slots 204$_{S(1)}$, 204$_{S(2)}$, and 204$_{S(3)}$ by a factor (e.g., denoted as a) dependent on a length of the link switch gap duration 1602. For example, the slot 204$_{S(1)}$ may have a duration 1604 of (ax9) μs, the slot 204$_{S(2)}$ may have a duration 1606 of (ax7) μs, and the slot 204$_{S(3)}$ may have a duration 1608 of (ax9) μs. In an example, the scheme 1600 may require an LBT measurement of at least 4 μs in each of the measurement periods 206*a* and 206*b*. In another example, the scheme 1600 allows for an LBT measurement with a measurement duration less than 4 μs by scaling the measurement periods 206*a* and 206*b*. Similar to the schemes 1100, 1200, 1300, 1400, and 1500, the node may determine that the LBT is a pass when the detected energy in both the measurement periods 206*a* and 206*b* are below a certain threshold. The node may determine that the LBT fails when the detected energy in any one of the measurement period 206*a* and/or 206*b* is above a certain threshold.

Figures 17, 18, 19:
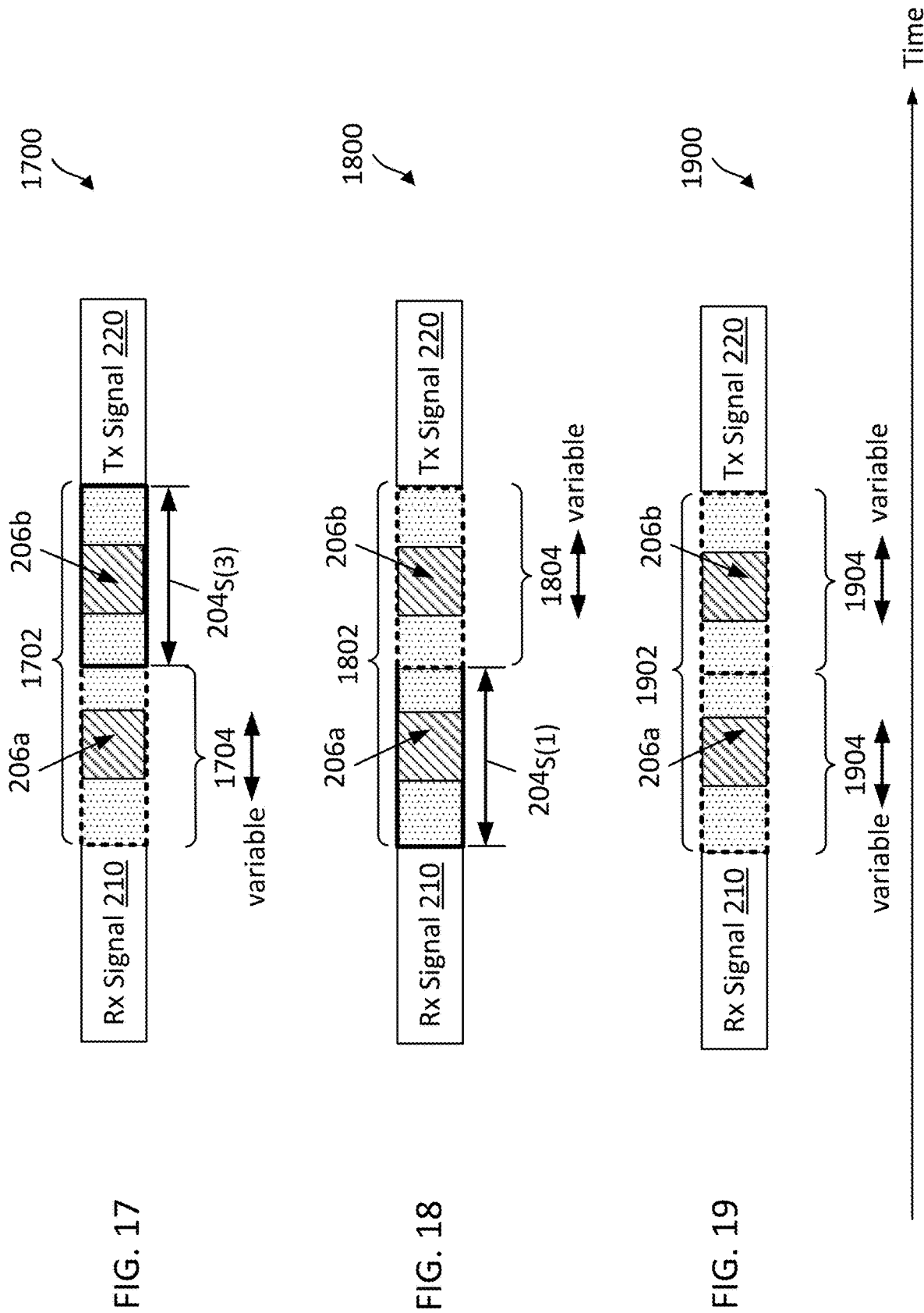
FIG. 17 is a timing diagram illustrating an LBT measurement scheme for variable link switch gap durations according to some embodiments of the present disclosure.
FIG. 18 is a timing diagram illustrating an LBT measurement scheme for variable link switch gap durations according to some embodiments of the present disclosure.
FIG. 19 is a timing diagram illustrating an LBT measurement scheme for variable link switch gap durations according to some embodiments of the present disclosure.

FIG. 17 is a timing diagram illustrating an LBT measurement scheme 1700 for variable link switch gap durations according to some embodiments of the present disclosure. The scheme 1700 is substantially similar to the scheme 1100. However, to accommodate a shorter link switch gap duration 1702, the scheme 1700 excludes the slot 204$_{S(2)}$. In other words, the link switch gap duration 1702 includes two slots 204$_{S(1)}$ and 204$_{S(3)}$, where LBT measurements are to be performed. The scheme 1700 maintains a duration of about 9 μs for the slot 204$_{S(3)}$ towards the end of the link switch gap duration 1702 and allows the slot 204$_{S(1)}$ at the beginning of the link switch gap duration 1302 to have a variable duration 1704 depending on the length of the link switch gap duration 1302. For 1700, the duration 1704 may be between about 4 μs to about 9 μs. In an example, the scheme 1600 may require an LBT measurement of at least 4 μs in each of the measurement periods 206*a* and 206*b*. In another example, the scheme 1700 allows for an LBT measurement with a measurement duration less than 4 μs in the period 206*a* when the duration 1704 is less than 4 μs. Similar to the schemes 1100, 1200, 1300,1400, 1500, and 1600, the node may determine that the LBT is a pass when the detected energy in both the measurement periods 206*a* and 206*b* are below a certain threshold. The node may determine that the LBT fails when the detected energy in any one of the measurement period 206*a* and/or 206*b* is above a certain threshold.

FIG. 18 is a timing diagram illustrating an LBT measurement scheme 1800 for variable link switch gap durations according to some embodiments of the present disclosure. The scheme 1800 is similar to the scheme 1700. However, to accommodate a shorter link switch gap duration 1802, the scheme 1800 maintains a duration of about 9 μs for the slot 204$_{S(1)}$ at the beginning of the link switch gap duration 1802 and allows the slot 204$_{S(3)}$ towards the end of the link switch gap duration 1802 to have a variable duration 1804 depending on the length of the link switch gap duration 1802. In an example, the scheme 1800 may require an LBT measurement of at least 4 μs in each of the measurement periods 206*a* and 206*b*. In another example, the scheme 1800 may allow an LBT measurement that is less than about 4 μs in the slot 204$_{S(3)}$ when the duration 1804 is less than 4 μs. Similar to the schemes 1100, 1200, 1300, 1400, 1500, 1600, and 1700, the node may determine that the LBT is a pass when the detected energy in both the measurement periods 206*a* and 206*b* are below a certain threshold. The node may determine that the LBT fails when the detected energy in any one of the measurement period 206*a* and/or 206*b* is above a certain threshold.

FIG. 19 is a timing diagram illustrating an LBT measurement scheme 1900 for variable link switch gap durations according to some embodiments of the present disclosure. The scheme 1900 is similar to the scheme 1700. However, to accommodate a shorter link switch gap duration 1902, the scheme 1900 partitions the two slots 204$_{S(1)}$ and 204$_{S(3)}$ with such that each of the slots 204$_{S(1)}$ and 204$_{S(3)}$ may have a duration 1904 of half the link switch gap duration 1902. In an example, the scheme 1900 may require an LBT measurement of at least 4 μs in each of the measurement periods 206*a* and 206*b*. In another example, the scheme 1900 may allow an LBT measurement that is less than about 4 μs in the each of the slots 204$_{S(1)}$ and 204$_{S(3)}$ when the duration 1904 is less than 4 μs. Similar to the schemes 1100, 1200, 1300, 1400, 1500, 1600, 1700, and 1800, the node may determine that the LBT is a pass when the detected energy in both the measurement periods 206*a* and 206*b* are below a certain threshold. The node may determine that the LBT fails when the detected energy in any one of the measurement period 206*a* and/or 206*b* is above a certain threshold.

While the schemes 1000-1900 are described in the context of a one-shot LBT or CAT2 LBT, in some embodiments, a node (e.g., a BS or a UE) may utilize the any of the schemes 1000-1900 for a CAT4 LBT. For a CAT4 LBT, a node may perform multiple LBT measurements in a channel during multiple measurement periods and may transmit when the channel is free (e.g., channel energy measurements below a certain threshold) for the multiple periods. The number of measurements may vary, for example, based on a contention window size and/or a random backoff period.

In an embodiment, a BS or a UE may utilize any suitable combination of the schemes 1000-1900 for LBT measurements. For example, when a link switch gap duration (e.g., the durations 630, 640, 730, 740, 830, 840, 930, or 940) is greater than about 18 μs, the BS or the UE may employ the scheme 1100. When the link switch gap duration is less than about 18 μs, the BS or the UE may employ the schemes 1700, 1800, or 1900.

In an embodiment, a gap duration (e.g., the durations 1002, 1102, 1202, 1302, 1402, 1502, 1602, 1702, 1802, or 1902), a DL-to-UL switch duration, (e.g., DL-to-UL switch durations 630, 730, 830, and 930) and/or a UL-to-DL switch duration (e.g., UL-to-DL switch durations 640, 740, 840, and 940) may be created by blanking out (e.g., with no transmission) one or more symbols (e.g., OFDM symbols). As described above, a gap may have to be controlled to be about 25 μs or less (for CAT2 LBT) or about 16 μs long or less (for CAT1 LBT i.e. no LBT) for performing LBT. In some instances, the gap duration may not correspond to the duration of an entire symbol or an integer number of symbols. FIGS. 20-23 illustrate various mechanisms for providing a specific link switch gap duration by employing cyclic extensions (e.g., in the form of a cyclic postfix or an extended cyclic prefix (ECP)) in a transmission prior to a link switch or subsequent to a link switch. In FIGS. 20-23, the schemes 2000-2300 may be employed by a wireless communication device such as the BSs 105 and 500 and the UEs 115 and 400 in a network such as the network 100. In particular, a wireless communication device may employ the schemes 2000, 2100, 2200, and 2300 to control a link switch gap duration. Additionally, the x-axes represent time in some constant units.

Figures 20, 21:
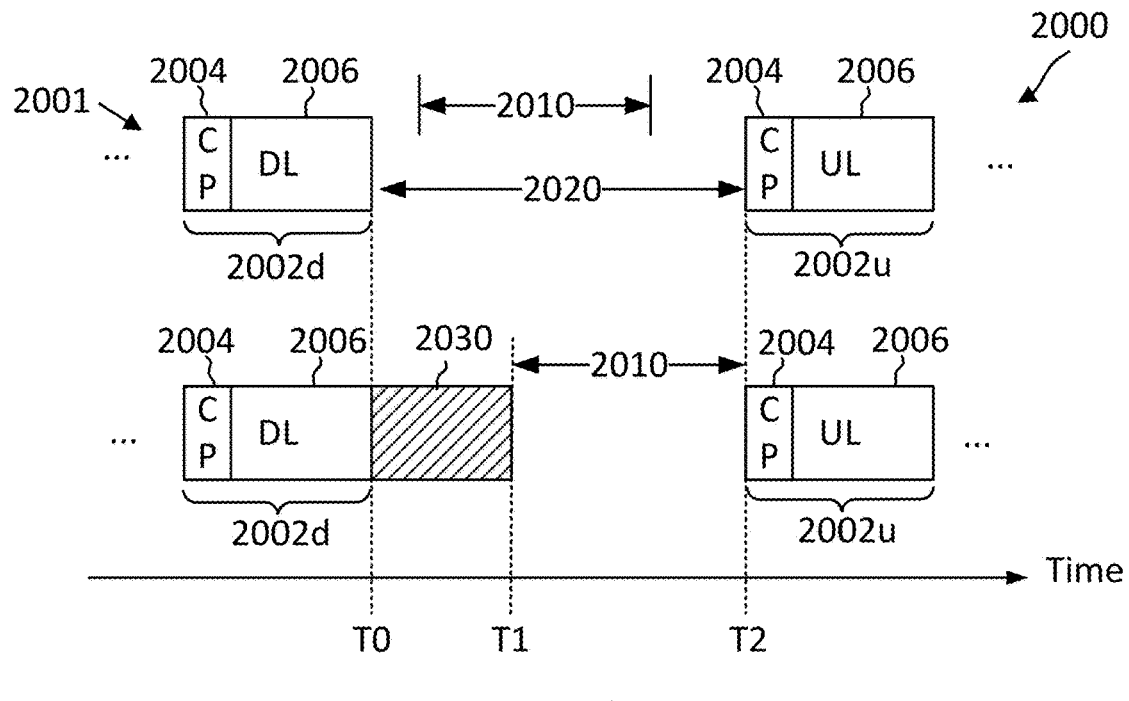
FIG. 20 is a timing diagram illustrating a transmission scheme that controls a downlink-to-uplink (DL-to-UL) switch gap duration for LBT measurements according to some embodiments of the present disclosure.
FIG. 21 is a timing diagram illustrating a transmission scheme that controls a DL-to-UL switch gap duration for LBT measurements according to some embodiments of the present disclosure.

FIG. 20 is a timing diagram illustrating a transmission scheme 2000 that controls a DL-to-UL switch gap duration for LBT measurements according to some embodiments of the present disclosure. The scheme 2000 illustrates a timeline 2001 at a BS where a last DL symbol 2002d of a DL signal (e.g., the DL signal 310) transmitted by the BS ends at a time T0 and a first UL symbol 2002u of a UL signal (e.g., the UL signal 320) transmitted by a UE begins at a time T2. Each symbol 2002 includes a cyclic prefix (CP) 2004 and a useful symbol portion 2006. The CP 2004 is generated by repeating an end portion of the useful symbol portion 2006. A DL symbol 2002d may carry DL data in the useful symbol portion 2006, whereas a UL symbol 2002u may carry UL data in the useful portion 2006. When a gap is created by blanking out transmission in units of symbols 2002, the DL-to-UL switch gap duration 2020 between the last DL symbol 2002d and the first UL symbol 2202u may be longer than the desired or required gap duration 2010 (e.g., of 16 μs or 25 μs) for performing LBT. In the scheme 2000, the BS may extend the last DL symbol 2002d (e.g., to time T1) to provide the desired or required DL-to-UL switch gap duration 2010. For example, the BS may generate the cyclic postfix 2030 by repeating a beginning portion of the DL symbol 2002d and appending the cyclic postfix 2030 to the end (e.g., at time T0) of the DL symbol 2002d.

The duration 2020 may include N number of symbols 2002 between the last symbol 2002d of the DL signal and the first symbol 2002u of the UL signal, where N is a positive integer. In an example, for an SCS of about 60 kHz, N may be about 2 for a desired gap duration 2010 of about 25 μs. For other SCSs, N may be about 1. The length or duration of the cyclic postfix 2030 may be shown computed as shown below:

$$\text{Cyclic postfix } 2030 \text{ duration} = N \times \text{symbol length} - \text{gap duration } 2010, \quad (1)$$

where the symbol length corresponds to the duration of a symbol 2002.

FIG. 21 is a timing diagram illustrating a transmission scheme 2100 that controls a DL-to-UL switch gap duration for LBT measurements according to some embodiments of the present disclosure. The scheme 2100 is described using the same BS timeline 2001 as the scheme 2000, and may use the same reference numerals as in FIG. 20 for simplicity's sake. In the scheme 2100, a UE may assume that a DL transmission ends at a symbol boundary (e.g., at time T0) before a DL-to-UL switch and may extend the CP 2004 of the first UL symbol 2002u after a DL-to-UL switch. As shown, the UE employs an ECP 2130 to provide the desired or required DL-to-UL switch gap duration 2010, where the transmission of the ECP 2130 begins at time T3 as shown by the timeline 2101. The ECP 2130 and the CP 2004 of the UL symbol 2002u may be a copy of end portion of the UL symbol 2002u. The length or duration of the ECP 2130 may be represented by N×symbol length–gap duration 2010, where the symbol length corresponds to the duration of a symbol 2002.

In an embodiment, the UE may take timing advance (e.g., the timing advance 604) into account while applying the ECP 2130. For example, in order to have a UL signal arrives at the BS at time T2, the UE may begin the UL transmission at an earlier time than T2, for example, at time T4, based on a timing advance 2104 as shown by the timeline 2102. Thus, the UE may apply a shorter ECP 2132 when timing advance is considered. The length or duration of the ECP 2132 may be computed as shown below:

$$\text{ECP } 2132 \text{ duration} = N \times \text{symbol length} - \text{gap duration } 2010 - \text{timing advance } 2104, \quad (2)$$

where the symbol length corresponds to the duration of a symbol 2002.

In an embodiment, a BS may signal DL-to-UL switch gap duration information to a UE via a DCI message, for example, along with a UL scheduling grant for a UL transmission after the switch. The DCI message may include an indicator indicating whether the UE is required to perform a CP extension for an UL transmission or begin the UL transmission at a particular offset. Accordingly, in some instances, the indicator may indicate a length of the CP extension. In an example, the DCI message may include the indicator jointly coded with a UE start offset indication and an LBT type indication (e.g., CAT1 LBT, CAT2 LBT of different durations, CAT4 LBT).

Figures 22, 23:
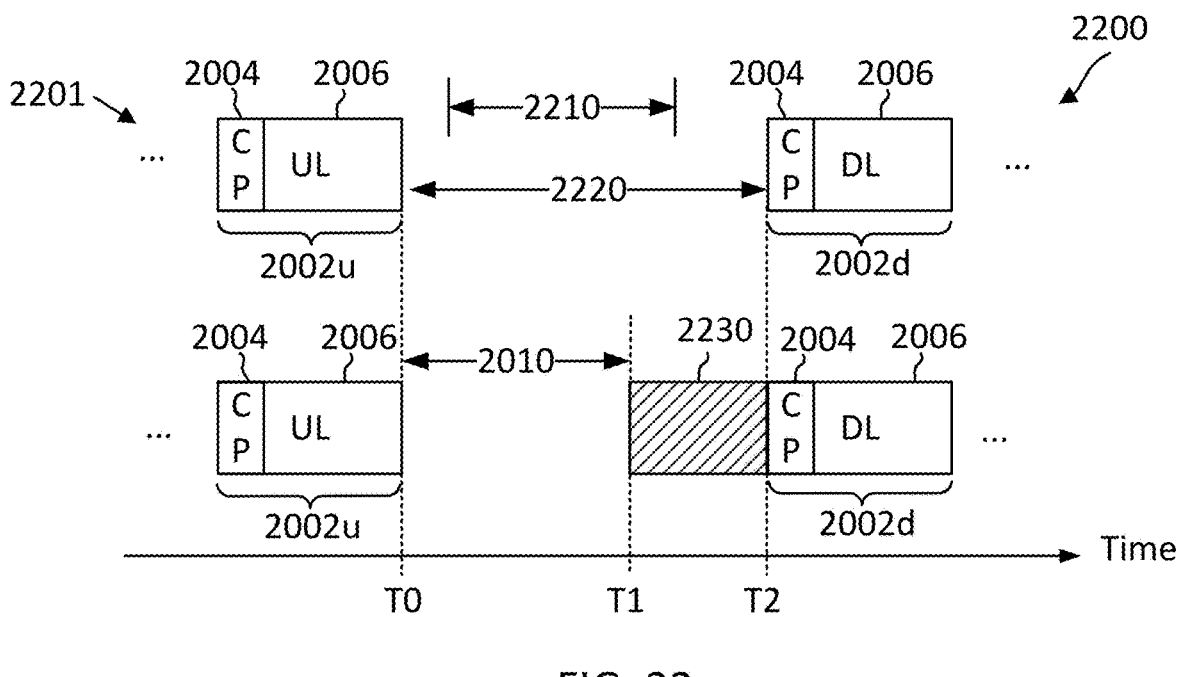
FIG. 22 is a timing diagram illustrating a transmission scheme that controls an uplink-to-downlink (UL-to-DL) switch gap duration for LBT measurements according to some embodiments of the present disclosure.
FIG. 23 is a timing diagram illustrating a transmission scheme that controls a UL-to-DL switch gap duration for LBT measurements according to some embodiments of the present disclosure.

FIG. 22 is a timing diagram illustrating a transmission scheme 2200 that controls a UL-to-DL switch gap duration for LBT measurements according to some embodiments of the present disclosure. The scheme 2200 illustrates a timeline 2201 at a BS where a last UL symbol 2002u of a UL signal (e.g., the UL signal 320) transmitted by a UE ends at a time T0 and a first DL symbol 2002d of a DL signal (e.g., the DL signal 310) transmitted by the BS begins at a time T2. Similar to the scheme 2000, when a gap is created by blanking out transmission in units of symbols 2002, the UL-to-DL switch gap duration 2220 between the last UL symbol 2002u and the first DL symbol 2202d may be longer than the required gap duration 2210 (e.g., of 16 μs or 25 μs). In the scheme 2200, the BS may extend the first DL symbol 2002d (e.g., to time T1) to provide the desired or required UL-to-DL switch gap duration 2210. For example, the BS may extend the CP 2004 of the first DL symbol 2002d after a UL-to-DL switch. As shown, the BS employs an ECP 2230 to provide the desired or required UL-to-DL switch gap duration 2210, where the transmission of the ECP 2230 begins at time T1. The length or duration of the ECP 2230 may be computed as shown below:

$$\text{ECP } 2230 \text{ duration} = N \times \text{symbol length} - \text{gap duration } 2210, \quad (3)$$

where the symbol length corresponds to the duration of a symbol 2002.

FIG. 23 is a timing diagram illustrating a transmission scheme 2300 that controls a UL-to-DL switch gap duration for LBT measurements according to some embodiments of the present disclosure. The scheme 2300 is described using the same BS timeline 2201 as the scheme 2200. In the scheme 2300, a UE may extend the last UL symbol 2002u (e.g., to time T5) to provide the desired or required gap duration 2210 for the UL-to-DL switch. For example, the BS may generate the cyclic postfix 2330 and append the cyclic postfix 2330 to the end (e.g., at time T0) of the UL symbol 2002u as shown by the timeline 2301. The length or duration of the cyclic postfix 2330 can be computed as shown below:

$$\text{Cyclic postfix } 2330 \text{ duration} = N \times \text{symbol length} - \text{gap duration } 2210, \quad (4)$$

where the symbol length corresponds to the duration of the symbol 2002.

In an example, the UE may take timing advance (e.g., the timing advance 604 and 2104) into account while applying the cyclic postfix 2330. For example, in order to have a UL signal to arrive at the BS at time T2, the UE may begin the UL transmission at an earlier time, example, at time T5, based on a timing advance 2304 as shown by the timeline 2302. Thus, the UE may apply a longer cyclic postfix 2332 when timing advance is considered. The length or duration of the cyclic postfix 2332 may be computed as shown below:

$$\text{Cyclic postfix } \mathbf{2332} = N \times \text{symbol length} - \text{gap duration } \mathbf{2210} + \text{timing advance } \mathbf{2304}, \quad (5)$$

where the symbol length corresponds to the duration of a symbol 2002. In some examples, timing advance is used to align a UL transmission transmitted by a UE to a slot boundary of a BS. In such examples, the UE may not be required to consider timing advance when determining a length or duration for a cyclic postfix. In other words, the UE may simply apply the cyclic postfix 2330 as shown in the timeline 2301.

In an embodiment, a BS may signal UL-to-DL switch gap duration information to a UE via a DCI message, for example, along with a UL scheduling grant for a UL transmission before the switch. The DCI message may include an indicator indicating whether a UE is required to apply a cyclic postfix (e.g., the cyclic postfix 2330 or 2332) for the UL transmission. When a UE is granted with a multi-transmission time interval (multi-TTI) grant for back-to-back UL transmissions, the UE may apply a cyclic postfix for the transmission in the last TTI before the UL-to-DL switch. The DCI message may further indicate a required link switch gap duration (e.g., the required gap duration 2010 or 2210) and the UE may apply a cyclic postfix accordingly. Alternatively, the DCI message may include an indicator indicating an LBT type (e.g., CAT1 LBT or CAT2 LBT) and the UE may determine a required UL-to-DL switch gap duration based on the LBT type.

In an embodiment, when a UE is given a minimum LBT gap duration for a UL-to-DL switch, the UE may assume that the first possible symbol immediately after the gap is a starting symbol for a DL transmission and apply a cyclic postfix accordingly. In other words, the UE may determine a length or duration for the cyclic postfix such that the UL-to-DL switch gap duration ends at a symbol boundary for the DL transmission.

In an embodiment, a BS may schedule a UE for a UL transmission after a DL transmission such that the UL transmission and the DL transmission are spaced apart by a certain DL-to-UL switch gap (e.g., about 25 μs). However, the BS may not have prior knowledge of the timing advance (e.g., the timing advance 2104) at the UE. Thus, the actual gap duration may be shorter. In addition, the propagation delay from the BS to the UE in the DL direction and/or delay spread of the DL channel can further reduce the actual gap duration at the UE. As an example, the BS may configure a DL-to-UL switch gap of about 25 μs. However, the gap at the UE may be reduced to a duration of 25 μs–timing advance–propagation delay–delay spread. When the timing advance is large, the actual gap at the UE may be too short for performing the LBT measurements described above. In an example, the UE may determine that the actual gap at the UE may be less than about 16 μs and/or other conditions satisfying a no LBT mode, and thus may perform no LBT prior to the UL transmission after the link switch. In an example, when the actual gap is short, the UE may puncture a beginning portion of the UL transmission to provide to a sufficient gap duration for performing LBT measurements.

In an embodiment, a BS may schedule a UL transmission after a DL transmission with a larger gap than a desired or required DL-to-UL switch gap duration and configure the UE to apply an extended ECP for the UL transmission such that the gap may include the desired or required DL-to-UL switch gap duration (e.g., the duration 2010) as shown in the scheme 2100.

In an embodiment, when a BS controls the gap duration for a link switch and informs a UE of an LBT type without the gap duration, the UE may fail an LBT in the gap. As an example, when the BS creates a DL-to-UL gap duration of about 20 μs and inform the UE of a CAT2 LBT, which may require about 25 μs. If the UE performs an LBT based on a 25 μs gap, the UE may end up measuring a portion of the BS's DL transmission signal and results in a failed LBT. Thus, the UE is required to have knowledge of the link switch gap duration to ensure that LBT measurements are performed within the gap duration. In an example, a wireless communication standard may predefine a link switch gap duration. In an example, the BS may configure the UE with the link switch gap duration via an RRC configuration. The RRC configuration can overwrite a predefined link switch gap duration. In an example, the BS may configure the UE with the link switch gap duration via an UL scheduling grant (e.g., a UE specific DCI message) and/or a group common PDCCH (GC-PDCCH) message. The BS should then ensure through its scheduling that at least the configured gap duration is provided from the BS's perspective or timeline for LBT measurements at the UE. The UE may take timing advance, propagation delay, and/or channel delay spread into account to determine the actual gap duration at the UE and perform an LBT based on the actual gap duration.

Figure 24:
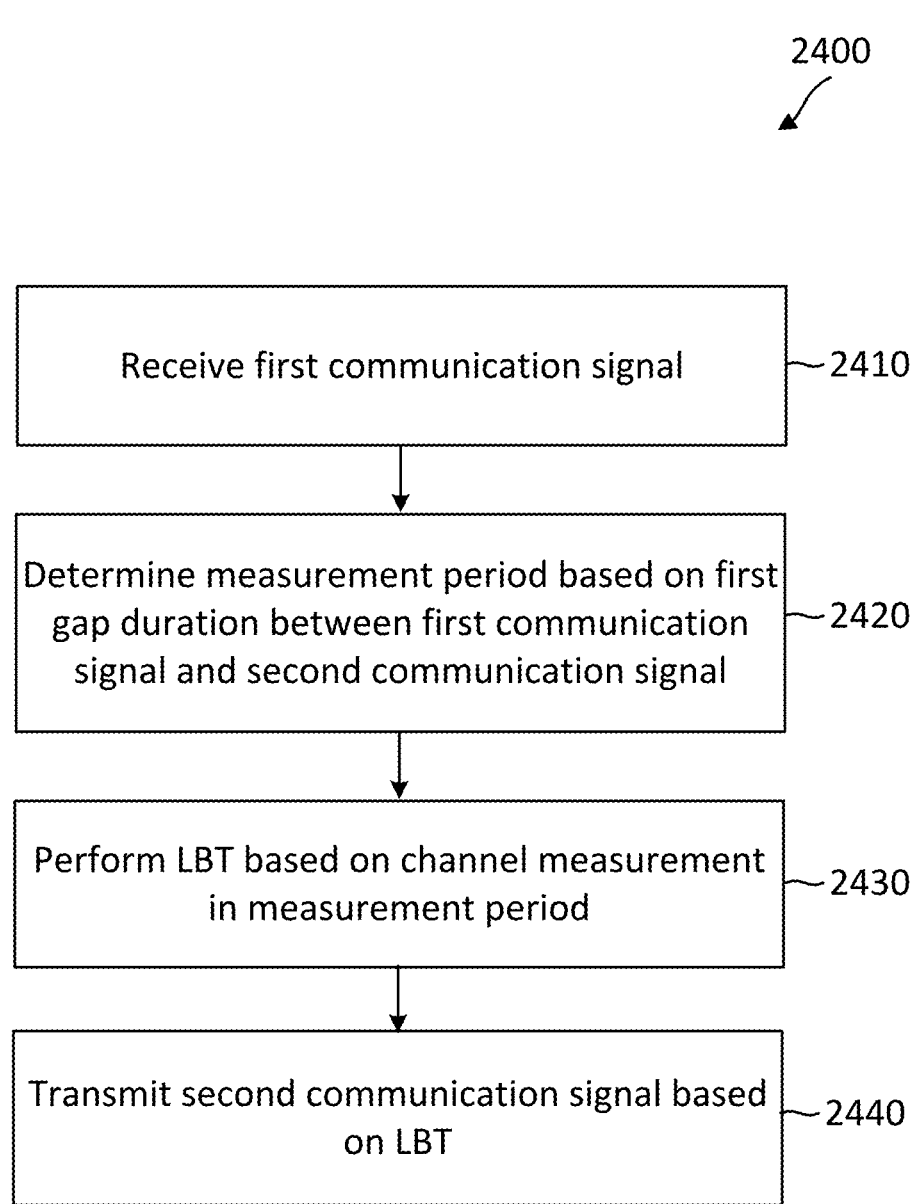
FIG. 24 is a flow diagram of a communication method according to some embodiments of the present disclosure.

FIG. 24 is a flow diagram of a communication method 2400 according to some embodiments of the present disclosure. Steps of the method 2400 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the LBT and measurement module 408, the communication module 409, the transceiver 410, the modem 412, and the one or more antennas 416, to execute the steps of method 2400. In another example, a wireless communication device, such as the BS 105 or BS 500, may utilize one or more components, such as the processor 502, the memory 504, the LBT and measurement module 508, the communication module 509, the transceiver 510, the modem 512, and the one or more antennas 516, to execute the steps of method 2400. The method 2400 may employ similar mechanisms as in the schemes 200, 600, 700, 800, 900, 1000, 1100, 1200, 1300, 1400, 1500, 1600, 1700, 1800, 1900, 2000, 2100, 2200, and 2300 as described above with respect to FIGS. 2, 6, 7, 8, 9, 10, 11, 12, 13, 14, 15, 16, 17, 18, 19, 20, 21, 22, and 23, respectively. As illustrated, the method 2400 includes a number of enumerated steps, but embodiments of the method 2400 may include additional steps before, after, and in between the enumerated steps. In some embodiments, one or more of the enumerated steps may be omitted or performed in a different order.

At step 2410, the method 2400 includes receiving, by a first wireless communication device from a second wireless communication device, a first communication signal.

At step 2420, the method 2400 includes determining, by the first wireless communication device, a measurement period based on a first gap duration between the first communication signal and a second communication signal.

At step 2430, the method 2400 includes performing, by the first wireless communication device, an LBT based on a channel measurement in the measurement period.

At step 2440, the method 2400 includes transmitting, by the first wireless communication device to the second wireless communication device, the second communication signal based on the LBT.

In an embodiment, the first wireless communication device corresponds to a BS and the second wireless communication device corresponds to a UE. The first communication signal may be similar to the communication signals 210 and the UL signals 320 and 620. The second communication signal may be similar to the communication signals 220 and the DL signals 310 and 610. The first gap duration may be similar to the UL-to-DL switch durations 640, 740, 840, and 940 and the gap durations 1002, 1102, 1202, 1302, 1402, 1502, 1602, 1702, 1802, 1902, 2010, and 2210. The measurement period may be similar to the measurement periods 206a and 206b.

In an embodiment, the first wireless communication device corresponds to a UE and the second wireless communication device corresponds to a BS. The first communication signal may be similar to the communication signals 220 and the DL signals 310 and 610. The second communication signal may be similar to the communication signals 210 and the UL signals 320 and 620. The first gap duration may be similar to the DL-to-UL switch durations 630, 730, 830, and 930 and the gap durations 1002, 1102, 1202, 1302, 1402, 1502, 1602, 1702, 1802, or 1902. The measurement period may be similar to the measurement periods 206a and 206b.

In an embodiment, the first wireless communication device determines an LBT type based on at least one of the first gap duration or a second gap duration between the between the first communication signal and the second communication signal. The LBT type may be a CAT1 LBT, a CAT2 LBT of different durations (e.g., 16 μs or 25 μs), or a CAT4 LBT. In an example, for a CAT1 LBT, the first wireless communication device may not perform any related LBT measurements to declare an LBT pass. In an example, for a CAT2 LBT, the first wireless communication device uses the measurement obtained during the measurement period and transmits the second communication signal when the measurement indicates the channel is not occupied during the measurement period. As discussed above with references to FIGS. 10-19, the measurement period for a CAT2 LBT may vary, and thus the LBT type may indicate a CAT2 LBT of a first duration or a CAT2 LBT or a CAT2 LBT of a second duration different from the first duration. For instance, the first CAT2 LBT duration can be about 16 μs and the second CAT2 LBT duration can be about 25 μs. In an example, for a CAT4 LBT, the first wireless communication device may transmit the second communication signal when the channel is free for multiple measurement periods. In other words, multiple LBT measurements obtained during multiple measurement periods are below a threshold. The number of measurement periods may be dependent on a contention window and/or a random backoff.

In an embodiment, the first gap duration is the same as the second gap duration. In an embodiment, the first gap duration is different from the second gap duration. In an embodiment, the first gap duration is associated with a first channel delay spread parameter, and the second gap duration is associated with a second channel delay spread parameter different from the first channel delay spread parameter.

In an embodiment, the first wireless communication device may be a BS and may transmit, to the second wireless communication device, an LBT configuration including the determined LBT type. In an embodiment, the first wireless communication device may be a UE and may receive, from the second wireless communication device, an LBT configuration including information associated with at least one of an LBT type or a link switch gap duration and determine the LBT type is further based on the received LBT configuration.

In an embodiment, the first wireless communication device determines the at least one of the first gap duration or the second gap duration based on a timing reference of second wireless communication device. For example, the determination of the at least one of the first gap duration or second gap duration is based on an end time of the first communication signal at the second wireless communication device and a start time of the second communication signal at the second wireless communication device. The start time is an expected start time based on timing maintained at the second wireless communication device. In an embodiment, the determination of the at least one of the first gap duration or second gap duration is further based on at least one of a channel delay spread parameter, a transmission timing advance parameter, or a multi-path channel parameter associated with a communication between the first wireless communication device and the second wireless communication device. In an example, of a multi-path channel, the second wireless communication device may receive multiple copies of the second communication signal from the first wireless communication device at different times via different paths. Thus, the first wireless communication device may further determine one or more expected reception start time at the second wireless communication device for determining at least one of the first gap duration or the second gap duration.

In an embodiment, the first wireless communication device determines the at least one of the first gap duration or the second gap duration based on absolute time. For example, the determination of the at least one of the first gap duration or second gap duration is based on an end time of the first communication signal at the first wireless communication device and a start time of the second communication signal at the first wireless communication device. In an embodiment, the determination of the at least one of the first gap duration or second gap duration is further based on at least one of a channel delay spread parameter or a transmission timing advance parameter associated with a communication between the first wireless communication device and the second wireless communication device. In an embodiment, the receiving includes receiving, by the first wireless communication device, the first communication signal via multiple paths. The first wireless communication device further determines the end time of the first communication signal based on one of the multiple paths. In an embodiment, the determining of the end time of the first communication signal is further based on a received signal threshold comparison (e.g., selecting a signal received from the strongest path).

In an embodiment, the first gap duration is with respect to a start time of the second communication signal at the first wireless communication device. In an embodiment, the first gap duration is with respect to a start time of the second communication signal at the second wireless communication device.

In an embodiment, the determining the measurement period includes determining, by the first wireless communication device, a first measurement period (e.g., the measurement period 206a) within a first portion (e.g., the slot 204$_{S(1)}$) of the first gap duration and a second measurement period (e.g., the measurement period 206a) within a second portion (e.g., the slot 204$_{S(3)}$) of the first gap duration, the second portion being adjacent to a start time of the second communication signal at the first wireless communication device.

In an embodiment, the performing the LBT includes determining, by the first wireless communication device, a channel status based on a comparison of at least one of a first channel measurement period in the first measurement period or a second channel measurement in second channel measurement period against a threshold.

In an embodiment, the first wireless communication device determines a duration for at least one of the first portion or the second portion based at least in part on the first gap duration (e.g., as shown in the schemes 1300, 1400, 1500, 1700, 1800, and 1900).

In an embodiment, at least the second portion includes a predetermined duration (e.g., of about 9 µs). In an embodiment, the first portion includes a first predetermined duration (e.g., of about 9 µs), the second portion includes a second predetermined duration (e.g., of about 9 µs), and the first portion and the second portion are non-overlapping. In an embodiment, the first portion includes a first predetermined duration (e.g., of about 9 µs), the second portion includes a second predetermined duration (e.g., of about 9 µs), and the first portion at least partially overlaps with the second portion (e.g., as shown in the scheme 1200).

In an embodiment, the first portion is spaced apart from the second portion. In an embodiment, the first wireless communication device determines a duration between the first portion and the second portion based at least in part on the first gap duration (e.g., as shown in the scheme 1100). In an embodiment, the first wireless communication device determines a duration for the first portion, a duration for the second portion, and a duration between the first portion and the second portion based at least in part on the first gap duration and a predetermined measurement gap duration (e.g., by applying a scaling factor as shown in the scheme 1600).

In an embodiment, the determining the measurement period includes determining, by the first wireless communication device, a single measurement period (e.g., the measurement period 206*b*) within a predetermined duration (e.g., the slot 204$_{S(3)}$ with a duration of 9 µs) of the first gap duration adjacent to a start time of the second communication signal at the first wireless communication device. The performing the LBT includes determining, by the first wireless communication device, a channel status (e.g., idle or busy) based on a comparison of a single channel measurement in the measurement period against a threshold as shown in the scheme 1000.

In an embodiment, the first wireless communication device receives, from the second wireless communication device, a third communication signal, where the second communication signal and the third communication signal are spaced apart by a second gap duration. The second communication signal includes a cyclic extension associated with at least one of the first gap duration or the second gap duration. In one embodiment, the first wireless communication device corresponds to a UE and the second wireless communication device corresponds to a BS. The UE receives the first communication signal from the BS, transmits the second communication signal to the BS after a DL-to-UL switch with the first gap duration, and receives the third communication signal from the BS after a UL-to-DL switch with the second gap duration. In another embodiment, the first wireless communication device corresponds to a BS and the second wireless communication device corresponds to a UE. The BS receives the first communication signal from the UE, transmits the second communication signal to the UE after a UL-to-DL switch with the first gap duration, and receives the third communication signal from the UE after a DL-to-UL switch with the second gap duration.

In an embodiment, the second communication signal includes one or more symbols (e.g., the symbols 2002) and a beginning symbol of the one or more symbols is prepended with an ECP (e.g., the ECPs 2130, 2132, and 2230) associated with the first gap duration. In an embodiment, the first wireless communication device transmits the one or more symbols at symbol boundaries of the first and second wireless communication device. The first wireless communication device determines a length for the ECP to provide the first gap duration, for example, based on a number of symbols between a last symbol (e.g., the symbol 2002*d* or the symbol 2002*u*) of the first communication signal and a beginning symbol (e.g., the symbol 2002*d* or the symbol 2002*u*) of the second communication signal.

In an embodiment, the second communication signal includes one or more symbols and a last symbol of the one or more symbols is appended with a cyclic postfix (e.g., the cyclic postfix 2030, 2330, and 2332) associated with the second gap duration. In an embodiment, the first wireless communication device transmits the one or more symbols at symbol boundaries of the first and second wireless communication device. The first wireless communication device determines a length for the cyclic postfix to provide the second gap duration, for example, based on a duration between a last symbol (e.g., the symbol 2002*d* or the symbol 2002*u*) of the second communication signal and a beginning symbol (e.g., the symbol 2002*d* or the symbol 2002*u*) of the third communication signal. In an embodiment, the first wireless communication device transmits the second communication signal by transmitting, to the second wireless communication device, two or more communication signals in two or more transmission time intervals (TTIs), wherein a last communication signal of the two or more communication signals includes the cyclic postfix.

In an embodiment, the first wireless communication device determines a length for the cyclic extension based on at least one of a timing advance (e.g., the timing advance 604, 2104, and 2304), a propagation delay, or a channel delay spread associated with a communication between the first wireless communication device and the second wireless communication device. In an embodiment, the first wireless communication device punctures a beginning portion of the second communication signal based on the first gap duration.

In an embodiment, the first wireless communication device communicates, with the second wireless communication device, a configuration indicating at least one of a ECP mode for the cyclic extension, a cyclic postfix mode for the cyclic extension, a starting offset for the second communication signal, the first gap duration, or the second gap duration. In an embodiment, the first wireless communication device communicates the configuration by communicating at least one of an RRC message including the configuration, a GC-PDCCH message including the configuration, or a scheduling grant including the configuration.

In an embodiment, the first wireless communication device communicates, with the second wireless communication device, a configuration indicating an LBT type, including at least one of a category 1 LBT, a category 2 LBT, or a category 4 LBT and determines the first gap duration based on the LBT type, where the LBT is performed based on the LBT type.

In an embodiment, the first wireless communication device transmits, to the second wireless communication device, a third communication signal before the first communication signal, where the first communication signal and the third communication signal are spaced apart by a second gap duration. The first communication signal includes one or more symbols and at least one of a beginning symbol of the one or more symbols is prepended with an extend cyclic prefix (ECP) associated with the second gap duration or a last symbol of the one or more symbols is appended with a cyclic postfix associated with the first gap duration. In one embodiment, the first wireless communication device corresponds to a UE and the second wireless communication device corresponds to a BS. The UE transmits the third communication signal to the BS, receives the second communication signal from the BS after a UL-to-DL switch with the second gap duration, and transmits the second communication signal to the BS after a DL-to-UL switch with the first gap duration. In another embodiment, the first wireless communication device corresponds to a BS and the second wireless communication device corresponds to a UE. The BS transmits the third communication signal to the UE, receives the second communication signal from the UE after a DL-to-UL switch with the second gap duration, and transmits the second communication signal to the UE after a UL-to-DL switch with the first gap duration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method may also include receiving, by a first wireless communication device from a second wireless communication device, a first communication signal. The method may also include determining, by the first wireless communication device, a measurement period based on a first gap duration between the first communication signal and a second communication signal. The method may also include performing, by the first wireless communication device, a listen-before-talk (LBT) based on a channel measurement in the measurement period. The method may also include transmitting, by the first wireless communication device to the second wireless communication device, the second communication signal based on the LBT.

In some aspects, the method may also include determining, by the first wireless communication device, an LBT type based on at least one of the first gap duration or a second gap duration between the first communication signal and the second communication signal, the LBT type including at least one of a category 1 LBT, a category 2 LBT, or a category 4 LBT, where the performing the LBT is further based on the LBT type. The first gap duration is the same as the second gap duration. The first gap duration is different from the second gap duration. The first gap duration is associated with a first channel delay spread parameter, and where the second gap duration is associated with a second channel delay spread parameter different from the first channel delay spread parameter. The method may also include transmitting, by the first wireless communication device to the second wireless communication device, an LBT configuration including at least the determined LBT type. The determining the LBT type is further based on the received LBT configuration. The method may also include determining, by the first wireless communication device, the at least one of the first gap duration or the second gap duration based on an end time of the first communication signal at the second wireless communication device and a start time of the second communication signal at the second wireless communication device. The determining the at least one of the first gap duration or the second gap duration is further based on at least one of a channel delay spread parameter, a transmission timing advance parameter, or a multi-path channel parameter associated with a communication between the first wireless communication device and the second wireless communication device. The method may also include determining, by the first wireless communication device, the at least one of the first gap duration or the second gap duration based on an end time of the first communication signal at the first wireless communication device and a start time of the second communication signal at the first wireless communication device. The determining the at least one of the first gap duration or the second gap duration is further based on at least one of a channel delay spread parameter or a transmission timing advance parameter associated with a communication between the first wireless communication device and the second wireless communication device. The receiving includes receiving, by the first wireless communication device, the first communication signal via multiple paths, and where The method may also include determining, by the first wireless communication device, the end time of the first communication signal based on one of the multiple paths. The determining the end time of the first communication signal is further based on a received signal threshold comparison. The first gap duration is with respect to a start time of the second communication signal at the first wireless communication device. The first gap duration is with respect to a start time of the second communication signal at the second wireless communication device. The determining the measurement period includes determining, by the first wireless communication device, a first measurement period within a first portion of the first gap duration and a second measurement period within a second portion of the first gap duration, the second portion being adjacent to a start time of the second communication signal at the first wireless communication device. The performing the LBT includes determining, by the first wireless communication device, a channel status based on a comparison of at least one of a first channel measurement in the first measurement period or a second channel measurement in the second measurement period against a threshold. The method may also include determining, by the first wireless communication device, a duration for at least one of the first portion or the second portion based at least in part on the first gap duration. At least the second portion includes a predetermined duration. The first portion includes a first predetermined duration, where the second portion includes a second predetermined duration, and where the first portion and the second portion are non-overlapping. The first portion includes a first predetermined duration, where the second portion includes a second predetermined duration, and where the first portion at least partially overlaps with the second portion. The first portion is spaced apart from the second portion. The method may also include determining, by the first wireless communication device, a duration between the first portion and the second portion based at least in part on the first gap duration. The method may also include determining, by the first wireless communication device, a duration for the first portion, a duration for the second portion, and a duration between the first portion and the second portion based at least in part on the first gap duration and a predetermined measurement gap duration. The determining the measurement period includes determining, by the first wireless communication device, a single measurement period within a predetermined duration of the first gap duration adjacent to a start time of the second communication signal at the first wireless communication device, and where the performing the LBT includes determining, by the first wireless communication device, a channel status based on a comparison of a single channel measurement in the measurement period against a threshold. The second communication signal includes a cyclic extension associated with at least one of the first gap duration or the second gap duration. The second communication signal includes one or more symbols, and where a beginning symbol of the one or more symbols is prepended with an extended cyclic prefix (ECP) associated with the first gap duration. The transmitting includes transmitting, by the first wireless communication device to the second wireless communication device, the one or more symbols based on a symbol boundary, and the method may also include determining, by the first wireless communication device, a length for the ECP to provide the first gap duration. The second communication signal includes one or more symbols, and where a last symbol of the one or more symbols is appended with a cyclic postfix associated with the second gap duration. The transmitting includes transmitting, by the first wireless communication device to the second wireless communication device, the one or more symbols based on a symbol boundary, and the method may also include determining, by the first wireless communication device, a length for the cyclic postfix to provide the second gap duration. The transmitting includes transmitting, by the first wireless communication device to the second wireless communication device, two or more communication signals in two or more transmission time intervals (TTIs), where a last communication signal of the two or more communication signals includes the cyclic postfix. The method may also include determining, by the first wireless communication device, a length for the cyclic extension based on at least one of a timing advance, a propagation delay, or a channel delay spread associated with a communication between the first wireless communication device and the second wireless communication device. The method may also include puncturing, by the first wireless communication device, a portion of the second communication signal based on the first gap duration. The method may also include communicating, by the first wireless communication device with the second wireless communication device, a configuration indicating at least one of an extended cyclic prefix (ECP) mode for the cyclic extension, a cyclic postfix mode for the cyclic extension, a starting offset for the second communication signal, the first gap duration, or the second gap duration. The communicating includes communicating, by the first wireless communication device with the second wireless communication device, at least one of a radio resource control (RRC) message including the configuration, a group common-physical downlink control channel (GC-PDCCH) message including the configuration, or a scheduling grant including the configuration. The performing the LBT is further based on the LBT type. The first communication signal includes one or more symbols, and where at least one of a beginning symbol of the one or more symbols is prepended with an extend cyclic prefix (ECP) associated with the second gap duration; or a last symbol of the one or more symbols is appended with a cyclic postfix associated with the first gap duration. The method may also include communicating, by the first wireless communication device with the second wireless communication device, a configuration indicating at least one of an ECP mode for the first communication signal, a cyclic postfix mode for the first communication signal, a starting offset for the first communication signal, the first gap duration, or the second gap duration.

Further embodiments of the present disclosure include an apparatus including a transceiver configured to receive, from a second wireless communication device, a first communication signal; and a processor configured to determine a measurement period based on a first gap duration between the first communication signal and a second communication signal; and perform a listen-before-talk (LBT) based on a channel measurement in the measurement period. The apparatus may also include where the transceiver is further configured to transmit, to the second wireless communication device, the second communication signal based on the LBT.

In some aspects, the apparatus may also include where the processor is further configured to determine an LBT type based on at least one of the first gap duration or a second gap duration between the first communication signal and the second communication signal, the LBT type including at least one of a category 1 LBT, a category 2 LBT, or a category 4 LBT; and perform the LBT further based on the LBT type. The first gap duration is the same as the second gap duration. The first gap duration is different from the second gap duration. The first gap duration is associated with a first channel delay spread parameter, and where the second gap duration is associated with a second channel delay spread parameter different from the first channel delay spread parameter. The transceiver is further configured to transmit, to the second wireless communication device, an LBT configuration including at least the determined LBT type. The transceiver is further configured to receive, from the second wireless communication device, an LBT configuration including information associated with at least one of the LBT type or the first gap duration, and where the processor is further configured to determine the LBT type further based on the received LBT configuration. The processor is further configured to determine the at least one of the first gap duration or the second gap duration based on an end time of the first communication signal at the second wireless communication device and a start time of the second communication signal at the second wireless communication device. The processor is further configured to determine the at least one of the first gap duration or the second gap duration further based on at least one of a channel delay spread parameter, a transmission timing advance parameter, or a multi-path channel parameter associated with a communication between the apparatus and the second wireless communication device. The processor is further configured to determine the at least one of the first gap duration or the second gap duration based on an end time of the first communication signal at the apparatus and a start time of the second communication signal at the apparatus. The processor is further configured to determine the at least one of the first gap duration or the second gap duration is further based on at least one of a channel delay spread parameter or a transmission timing advance parameter associated with a communication between the apparatus and the second wireless communication device. The transceiver is further configured to receive the first communication signal via multiple paths, and where the processor is further configured to determine the end time of the first communication signal based on one of the multiple paths. The processor is further configured to determine the end time of the first communication signal further based on a received signal threshold comparison. The first gap duration is with respect to a start time of the second communication signal at the apparatus. The first gap duration is with respect to a start time of the second communication signal at the second wireless communication device. The processor is further configured to determine the measurement period by determining a first measurement period within a first portion of the first gap duration and a second measurement period within a second portion of the first gap duration, the second portion being adjacent to a start time of the second communication signal at the apparatus. The processor is further configured to perform the LBT by determining a channel status based on a comparison of at least one of a first channel measurement in the first measurement period or a second channel measurement in the second measurement period against a threshold. The processor is further configured to determine a duration for at least one of the first portion or the second portion based at least in part on the first gap duration. At least the second portion includes a predetermined duration. The first portion includes a first predetermined duration, where the second portion includes a second predetermined duration, and where the first portion and the second portion are non-overlapping. The first portion includes a first predetermined duration, where the second portion includes a second predetermined duration, and where the first portion at least partially overlaps with the second portion. The first portion is spaced apart from the second portion. The processor is further configured to determine a duration between the first portion and the second portion based at least in part on the first gap duration. The processor is further configured to determine a duration for the first portion, a duration for the second portion, and a duration between the first portion and the second portion based at least in part on the first gap duration and a predetermined measurement gap duration. The processor is further configured to determine the measurement period by determining a single measurement period within a predetermined duration of the first gap duration adjacent to a start time of the second communication signal at the apparatus; and perform the LBT by determining a channel status based on a comparison of a single channel measurement in the measurement period against a threshold. The transceiver is further configured to receive, from the second wireless communication device, a third communication signal, the second communication signal and the third communication signal spaced apart by a second gap duration, where the second communication signal includes a cyclic extension associated with at least one of the first gap duration or the second gap duration. The second communication signal includes one or more symbols, and where a beginning symbol of the one or more symbols is prepended with an extended cyclic prefix (ECP) associated with the first gap duration. The transceiver is further configured to transmit the second communication signal by transmitting the one or more symbols based on a symbol boundary, and the processor is further configured to determine a length for the ECP to provide the first gap duration. The second communication signal includes one or more symbols, and where a last symbol of the one or more symbols is appended with a cyclic postfix associated with the second gap duration. The transceiver is further configured to transmit the second communication signal by transmitting the one or more symbols based on a symbol boundary, and the processor is further configured to determine a length for the cyclic postfix to provide the second gap duration. The transceiver is further configured to transmit the second communication signal by transmitting, to the second wireless communication device, two or more communication signals in two or more transmission time intervals (TTIs), and where a last communication signal of the two or more communication signals includes the cyclic postfix. The processor is further configured to determine a length for the cyclic extension based on at least one of a timing advance, a propagation delay, or a channel delay spread associated with a communication between the apparatus and the second wireless communication device. The processor is further configured to puncture a portion of the second communication signal based on the first gap duration. The transceiver is further configured to communicate with the second wireless communication device, a configuration indicating at least one of an extended cyclic prefix (ECP) mode for the cyclic extension, a cyclic postfix mode for the cyclic extension, a starting offset for the second communication signal, the first gap duration, or the second gap duration. The transceiver is further configured to communicate the configuration by communicating, with the second wireless communication device, at least one of a radio resource control (RRC) message including the configuration, a group common-physical downlink control channel (GC-PDCCH) message including the configuration, or a scheduling grant including the configuration. The transceiver is further configured to communicate, with the second wireless communication device, a configuration indicating an LBT type, including at least one of a category 1 LBT, a category 2 LBT, or a category 4 LBT, the processor is further configured to determine the first gap duration based on the LBT type, and where the LBT is performed further based on the LBT type. The transceiver is further configured to transmit, to the second wireless communication device, a third communication signal before the first communication signal, the first communication signal and the third communication signal spaced apart by a second gap duration, where the first communication signal includes one or more symbols, and where at least one of a beginning symbol of the one or more symbols is prepended with an extend cyclic prefix (ECP) associated with the second gap duration; or a last symbol of the one or more symbols is appended with a cyclic postfix associated with the first gap duration. The transceiver is further configured to communicate, with the second wireless communication device, a configuration indicating at least one of an ECP mode for the first communication signal, a cyclic postfix mode for the first communication signal, a starting offset for the first communication signal, the first gap duration, or the second gap duration.

Further embodiments of the present disclosure include a non-transitory computer-readable medium having program code recorded thereon. The non-transitory computer-readable medium includes code for causing a first wireless communication device to receive, from a second wireless communication device, a first communication signal. The non-transitory computer-readable medium includes code for causing the first wireless communication device to determine a measurement period based on a first gap duration between the first communication signal and a second communication signal. The non-transitory computer-readable medium includes code for causing the first wireless communication device to perform a listen-before-talk (LBT) based on a channel measurement in the measurement period. The non-transitory computer-readable medium includes code for causing the first wireless communication device to transmit, to the second wireless communication device, the second communication signal based on the LBT.

In some aspects, the non-transitory computer-readable medium may also include code for causing the first wireless communication device to determine an LBT type based on at least one of the first gap duration or a second gap duration between the first communication signal and the second communication signal, the LBT type including at least one of a category 1 LBT, a category 2 LBT, or a category 4 LBT, where the code for causing the first wireless communication device to perform the LBT is further configured to perform the LBT based on the LBT type. The first gap duration is the same as the second gap duration. The first gap duration is different from the second gap duration. The first gap duration is associated with a first channel delay spread parameter, and where the second gap duration is associated with a second channel delay spread parameter different from the first channel delay spread parameter. The non-transitory computer-readable medium may also include code for causing the first wireless communication device to transmit, to the second wireless communication device, an LBT configuration including at least the determined LBT type. The code for causing the first wireless communication device to determine the LBT type is further configured to determine the LBT type based on the received LBT configuration. The non-transitory computer-readable medium may also include code for causing the first wireless communication device to determine the at least one of the first gap duration or the second gap duration based on an end time of the first communication signal at the second wireless communication device and a start time of the second communication signal at the second wireless communication device. The code for causing the first wireless communication device to determine the at least one of the first gap duration or the second gap duration is further configured to determine the at least one of the first gap duration or the second gap duration based on at least one of a channel delay spread parameter, a transmission timing advance parameter, or a multi-path channel parameter associated with a communication between the first wireless communication device and the second wireless communication device. The non-transitory computer-readable medium may also include code for causing the first wireless communication device to determine the at least one of the first gap duration or the second gap duration based on an end time of the first communication signal at the first wireless communication device and a start time of the second communication signal at the first wireless communication device. The code for causing the first wireless communication device to determine the at least one of the first gap duration or the second gap duration is further configured to determine the at least one of the first gap duration or the second gap duration based on at least one of a channel delay spread parameter or a transmission timing advance parameter associated with a communication between the first wireless communication device and the second wireless communication device. The code for causing the first wireless communication device to receive the first communication signal via multiple paths, and where the non-transitory computer-readable medium may also include code for causing the first wireless communication device to determine the end time of the first communication signal based on one of the multiple paths. The code for causing the first wireless communication device to determine the end time of the first communication signal is further configured to the determine the end time of the first communication signal based on a received signal threshold comparison. The first gap duration is with respect to a start time of the second communication signal at the first wireless communication device. The first gap duration is with respect to a start time of the second communication signal at the second wireless communication device. The code for causing the first wireless communication device to determine the measurement period is further configured to determine a first measurement period within a first portion of the first gap duration and a second measurement period within a second portion of the first gap duration, the second portion being adjacent to a start time of the second communication signal at the first wireless communication device. The code for causing the first wireless communication device to perform the LBT is further configured to determine a channel status based on a comparison of at least one of a first channel measurement in the first measurement period or a second channel measurement in the second measurement period against a threshold. The non-transitory computer-readable medium may also include code for causing the first wireless communication device to determine a duration for at least one of the first portion or the second portion based at least in part on the first gap duration. At least the second portion includes a predetermined duration. The first portion includes a first predetermined duration, where the second portion includes a second predetermined duration, and where the first portion and the second portion are non-overlapping. The first portion includes a first predetermined duration, where the second portion includes a second predetermined duration, and where the first portion at least partially overlaps with the second portion. The first portion is spaced apart from the second portion. The non-transitory computer-readable medium may also include code for causing the first wireless communication device to determine a duration between the first portion and the second portion based at least in part on the first gap duration.

The non-transitory computer-readable medium may also include code for causing the first wireless communication device to determine a duration for the first portion, a duration for the second portion, and a duration between the first portion and the second portion based at least in part on the first gap duration and a predetermined measurement gap duration. The code for causing the first wireless communication device to determine the measurement period is further configured to determine a single measurement period within a predetermined duration of the first gap duration adjacent to a start time of the second communication signal at the first wireless communication device, and where the code for causing the first wireless communication device to perform the LBT is further configured to determine a channel status based on a comparison of a single channel measurement in the measurement period against a threshold. The second communication signal includes a cyclic extension associated with at least one of the first gap duration or the second gap duration. The second communication signal includes one or more symbols, and where a beginning symbol of the one or more symbols is prepended with an extended cyclic prefix (ECP) associated with the first gap duration. The code for causing the first wireless communication device to transmit the second communication signal is further configured to transmit the one or more symbols based on a symbol boundary, and the non-transitory computer-readable medium may also include code for causing the first wireless communication device to determine a length for the ECP to provide the first gap duration. The second communication signal includes one or more symbols, and where a last symbol of the one or more symbols is appended with a cyclic postfix associated with the second gap duration. The code for causing the first wireless communication device to transmit the second communication signal is further configured to transmit the one or more symbols based on a symbol boundary, and the non-transitory computer-readable medium may also include code for causing the first wireless communication device to determine a length for the cyclic postfix to provide the second gap duration. The non-transitory computer-readable medium may also include code for causing the first wireless communication device to puncture a portion of the second communication signal based on the first gap duration. The code for causing the first wireless communication device to transmit the second communication signal is further configured to transmit, to the second wireless communication device, two or more communication signals in two or more transmission time intervals (TTIs), and where a last communication signal of the two or more communication signals includes the cyclic postfix. The non-transitory computer-readable medium may also include code for causing the first wireless communication device to determine a length for the cyclic extension based on at least one of a timing advance, a propagation delay, or a channel delay spread associated with a communication between the first wireless communication device and the second wireless communication device. The non-transitory computer-readable medium may also include code for causing the first wireless communication device to communicate, with the second wireless communication device, a configuration indicating at least one of an extended cyclic prefix (ECP) mode for the cyclic extension, a cyclic postfix mode for the cyclic extension, a starting offset for the second communication signal, the first gap duration, or the second gap duration. The code for causing the first wireless communication device to communicate the configuration is further configured to communicate, with the second wireless communication device, at least one of a radio resource control (RRC) message including the configuration, a group common-physical downlink control channel (GC-PDCCH) message including the configuration, or a scheduling grant including the configuration. The code for causing the first wireless communication device to perform the LBT is further configured to perform the LBT further based on the LBT type. The first communication signal includes one or more symbols, and where at least one of a beginning symbol of the one or more symbols is prepended with an extend cyclic prefix (ECP) associated with the second gap duration; or a last symbol of the one or more symbols is appended with a cyclic postfix associated with the first gap duration. The non-transitory computer-readable medium may also include code for causing the first wireless communication device to communicate, with the second wireless communication device, a configuration indicating at least one of an ECP mode for the first communication signal, a cyclic postfix mode for the first communication signal, a starting offset for the first communication signal, the first gap duration, or the second gap duration.

Further embodiments of the present disclosure include an apparatus including means for receiving, from a second wireless communication device, a first communication signal. The apparatus may also include means for determining a measurement period based on a first gap duration between the first communication signal and a second communication signal. The apparatus may also include means for performing a listen-before-talk (LBT) based on a channel measurement in the measurement period. The apparatus may also include means for transmitting, to the second wireless communication device, the second communication signal based on the LBT.

In some aspects, the apparatus may also include means for determining an LBT type based on at least one of the first gap duration or a second gap duration between the first communication signal and the second communication signal, the LBT type including at least one of a category 1 LBT, a category 2 LBT, or a category 4 LBT, where the means for performing the LBT is further configured to perform the LBT based on the LBT type. The first gap duration is the same as the second gap duration. The first gap duration is different from the second gap duration. The first gap duration is associated with a first channel delay spread parameter, and where the second gap duration is associated with a second channel delay spread parameter different from the first channel delay spread parameter. The apparatus may also include means for transmitting, to the second wireless communication device, an LBT configuration including at least the determined LBT type. The means for determining the LBT type is further configured to determine the LBT type based on the received LBT configuration. The apparatus may also include means for determining the at least one of the first gap duration or the second gap duration based on an end time of the first communication signal at the second wireless communication device and a start time of the second communication signal at the second wireless communication device. The means for determining the at least one of the first gap duration or the second gap duration is further configured to determine the at least one of the first gap duration or the second gap duration based on at least one of a channel delay spread parameter, a transmission timing advance parameter, or a multi-path channel parameter associated with a communication between the apparatus and the second wireless communication device. The apparatus may also include means for determining the at least one of the first gap duration or the second gap duration based on an end time of the first communication signal at the apparatus and a start time of the second communication signal at the apparatus. The means for determining the at least one of the first gap duration or the second gap duration is further configured to determine the at least one of the first gap duration or the second gap duration based on at least one of a channel delay spread parameter or a transmission timing advance parameter associated with a communication between the apparatus and the second wireless communication device. The means for receiving the first communication signal is further configured to receive the first communication signal via multiple paths, and where the apparatus may also include means for determining the end time of the first communication signal based on one of the multiple paths. The means for determining the end time of the first communication signal is further configured to determine the end time of the first communication signal based on a received signal threshold comparison. The first gap duration is with respect to a start time of the second communication signal at the apparatus. The first gap duration is with respect to a start time of the second communication signal at the second wireless communication device. The means for determining the measurement period is further configured to determine a first measurement period within a first portion of the first gap duration and a second measurement period within a second portion of the first gap duration, the second portion being adjacent to a start time of the second communication signal at the apparatus. The means for performing the LBT is further configured to determine a channel status based on a comparison of at least one of a first channel measurement in the first measurement period or a second channel measurement in the second measurement period against a threshold. The apparatus may also include means for determining a duration for at least one of the first portion or the second portion based at least in part on the first gap duration. At least the second portion includes a predetermined duration. The first portion includes a first predetermined duration, where the second portion includes a second predetermined duration, and where the first portion and the second portion are non-overlapping. The first portion includes a first predetermined duration, where the second portion includes a second predetermined duration, and where the first portion at least partially overlaps with the second portion. The first portion is spaced apart from the second portion. The apparatus may also include means for determining a duration between the first portion and the second portion based at least in part on the first gap duration. The apparatus may also include means for determining a duration for the first portion, a duration for the second portion, and a duration between the first portion and the second portion based at least in part on the first gap duration and a predetermined measurement gap duration. The means for determining the measurement period is further configured to determine a single measurement period within a predetermined duration of the first gap duration adjacent to a start time of the second communication signal at the apparatus, and the means for performing the LBT is further configured to determine a channel status based on a comparison of a single channel measurement in the measurement period against a threshold. The second communication signal includes a cyclic extension associated with at least one of the first gap duration or the second gap duration. The second communication signal includes one or more symbols, and where a beginning symbol of the one or more symbols is prepended with an extended cyclic prefix (ECP) associated with the first gap duration. The means for transmitting the second communication signal is further configured to transmit the one or more symbols based on a symbol boundary, and the apparatus may also include means for determining a length for the ECP to provide the first gap duration. The second communication signal includes one or more symbols, and where a last symbol of the one or more symbols is appended with a cyclic postfix associated with the second gap duration. The means for transmitting the second communication signal is further configured to transmit the one or more symbols based on a symbol boundary, and the apparatus may also include means for determining a length for the cyclic postfix to provide the second gap duration. The means for transmitting the second communication signal is further configured to transmit, to the second wireless communication device, two or more communication signals in two or more transmission time intervals (TTIs), and where a last communication signal of the two or more communication signals includes the cyclic postfix. The apparatus may also include means for determining a length for the cyclic extension based on at least one of a timing advance, a propagation delay, or a channel delay spread associated with a communication between the apparatus and the second wireless communication device. The apparatus may also include means for puncturing a portion of the second communication signal based on the first gap duration. The apparatus may also include means for communicating, with the second wireless communication device, a configuration indicating at least one of an extended cyclic prefix (ECP) mode for the cyclic extension, a cyclic postfix mode for the cyclic extension, a starting offset for the second communication signal, the first gap duration, or the second gap duration. The means for communicating the configuration is further configured to communicate, with the second wireless communication device, at least one of a radio resource control (RRC) message including the configuration, a group common-physical downlink control channel (GC-PDCCH) message including the configuration, or a scheduling grant including the configuration. The means for performing the LBT is further configured to perform the LBT further based on the LBT type. The first communication signal includes one or more symbols, and where at least one of a beginning symbol of the one or more symbols is prepended with an extend cyclic prefix (ECP) associated with the second gap duration; or a last symbol of the one or more symbols is appended with a cyclic postfix associated with the first gap duration. The apparatus may also include means for communicating, with the second wireless communication device, a configuration indicating at least one of an ECP mode for the first communication signal, a cyclic postfix mode for the first communication signal, a starting offset for the first communication signal, the first gap duration, or the second gap duration.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    receiving, at a first wireless communication device, a first communication signal;
    performing, by the first wireless communication device, a listen-before-talk (LBT) based at least in part on one or more channel measurements in one or more measurement periods of a gap duration between the first communication signal and a second communication signal, wherein a timing of the one or more measurement periods is associated with a time partitioning of the gap duration into a plurality of gap duration portions, and wherein a quantity of the plurality of gap duration portions is associated with a length of the gap duration; and transmitting, by the first wireless communication device, the second communication signal based on the LBT.

2. The method of claim 1, wherein:

a first portion of the gap duration is adjacent to a start time of the second communication signal;

a total duration of the one or more measurement periods is based on the gap duration;

the one or more channel measurements comprises a first channel measurement and a second channel measurement;

the one or more measurement periods comprises a first measurement period and a second measurement period;

the second measurement period is within a second portion of the gap duration; and the performing the LBT is based on the first channel measurement obtained in the first measurement period, and the second channel measurement obtained in the second measurement period.

3. The method of claim 2, wherein the first portion of the gap duration is longer than the second portion of the gap duration.

4. The method of claim 2, wherein the first measurement period is longer than the second measurement period.

5. The method of claim 2, wherein the performing the LBT includes:

determining, by the first wireless communication device, a channel status based on a comparison of at least one of the first channel measurement in the first measurement period or the second channel measurement in the second measurement period against a threshold.

6. The method of claim 2, wherein the performing the LBT includes:

determining, by the first wireless communication device, a channel status based on a comparison of a single channel measurement in the first measurement period against a threshold, the single channel measurement corresponding to the first channel measurement.

7. The method of claim 1, wherein:

a first portion of the gap duration is adjacent to a start time of the second communication signal;

a total duration of the one or more measurement periods is based on the gap duration; and the first portion of the gap duration includes a slot having a predetermined duration.

8. The method of claim 7, wherein the predetermined duration of the slot is 9 microseconds (μs), and wherein the one or more measurement periods comprises a first measurement period having a duration of at least 4 μs within the slot.

9. The method of claim 1, wherein the second communication signal includes one or more symbols and a cyclic extension associated with the gap duration, and wherein a beginning symbol of the one or more symbols is prepended with the cyclic extension.

10. The method of claim 9, wherein:

the transmitting includes:

transmitting, by the first wireless communication device to a second wireless communication device, the one or more symbols based on a symbol boundary, and the method further comprises:

determining, by the first wireless communication device, a length for the cyclic extension to provide the gap duration.

11. The method of claim 10, wherein the determining the length for the cyclic extension includes:

determining, by the first wireless communication device, the length for the cyclic extension based on a timing advance associated with a communication between the first wireless communication device and the second wireless communication device.

12. The method of claim 9, further comprising:

receiving, by the first wireless communication device from a second wireless communication device, a configuration including at least one of:

a first indicator including at least one of a length of the cyclic extension, a starting offset for the second communication signal, or a switch gap configuration; or a second indicator including the LBT type.

13. The method of claim 12, wherein the receiving the configuration includes:

receiving, by the first wireless communication device from the second wireless communication device, at least one of a radio resource control (RRC) message including the configuration, a group common-physical downlink control channel (GC-PDCCH) message including the configuration, or a scheduling grant including the configuration.

14. The method of claim 12, wherein:

the receiving the configuration includes:

receiving, by the first wireless communication device from the second wireless communication device, the second indicator including the LBT type jointly coded with the first indicator; and the performing the LBT is further based on the LBT type.

15. The method of claim 14, wherein the LBT type is a category LBT, a category 2 LBT associated with a first duration, a category 2 LBT associated with a second duration different from the first duration, or a category 4 LBT.

16. An apparatus comprising:

a transceiver configured to receive a first communication signal; and a processor configured to:

perform a listen-before-talk (LBT) based at least in part on one or more channel measurements in one or more measurement periods of a gap duration between the first communication signal and a second communication signal, wherein a timing of the one or more measurement periods is associated with a time-partitioning of the gap duration into a plurality of gap duration portions, and wherein a quantity of the plurality of gap duration portions is associated with a length of the gap duration, wherein the transceiver is further configured to transmit the second communication signal based on the LBT.

17. The apparatus of claim 16, wherein the one or more channel measurements comprises a first channel measurement and a second channel measurement;

a first portion of the gap duration is adjacent to a start time of the second communication signal;

a total duration of the one or more measurement periods is based on the gap duration;

the one or more measurement periods comprises a first measurement period and a second measurement period; and the LBT is based on the first channel measurement obtained in the first measurement period, and the second channel measurement obtained in the second measurement period.

18. The apparatus of claim 17, wherein the processor configured to perform the LBT is configured to:

determine a channel status based on a comparison of at least one of the first channel measurement in the first measurement period or the second channel measurement in the second measurement period against a threshold.

19. The apparatus of claim 16, wherein:

a first portion of the gap duration is adjacent to a start time of the second communication signal;

a total duration of the one or more measurement periods is based on the gap duration;

the first portion of the gap duration is a slot having a predetermined duration of 9 microseconds (µs); and the one or more measurement periods comprises a first measurement period having a duration of at least 4 µs within the slot.

20. The apparatus of claim 16, wherein the second communication signal includes one or more symbols and a cyclic extension associated with the gap duration, and wherein a beginning symbol of the one or more symbols is prepended with the cyclic extension.

*  *  *  *  *

50